US011955616B2

(12) United States Patent
Tsuchiya

(10) Patent No.: US 11,955,616 B2
(45) Date of Patent: Apr. 9, 2024

(54) ELECTRIC ENERGY STORAGE SYSTEM AND VEHICLE

(71) Applicant: TOYOTA JIDOSHA KABUSHIKI KAISHA, Toyota (JP)

(72) Inventor: Yoshiyuki Tsuchiya, Hamamatsu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 351 days.

(21) Appl. No.: 17/241,182

(22) Filed: Apr. 27, 2021

(65) Prior Publication Data
US 2021/0376402 A1   Dec. 2, 2021

(30) Foreign Application Priority Data

Jun. 2, 2020 (JP) .................................. 2020-096113

(51) Int. Cl.
| | |
|---|---|
| *H01M 10/625* | (2014.01) |
| *B60L 53/30* | (2019.01) |
| *B60L 53/53* | (2019.01) |
| *B60L 53/66* | (2019.01) |
| *H01M 10/63* | (2014.01) |

(52) U.S. Cl.
CPC ......... *H01M 10/625* (2015.04); *B60L 53/305* (2019.02); *B60L 53/53* (2019.02); *B60L 53/66* (2019.02); *H01M 10/63* (2015.04); *H01M 2220/20* (2013.01)

(58) Field of Classification Search
CPC .......................... H01M 10/625; H01M 10/443
See application file for complete search history.

(56) References Cited

U.S. PATENT DOCUMENTS

| | | | |
|---|---|---|---|
| 2012/0217933 A1 | 8/2012 | Abe et al. | |
| 2013/0162027 A1 | 6/2013 | Yamamoto et al. | |
| 2018/0154790 A1 | 6/2018 | Homma et al. | |
| 2019/0214693 A1* | 7/2019 | Iida ..................... | H01M 10/443 |
| 2019/0280509 A1* | 9/2019 | Yokoyama ............... | H02J 7/00 |

FOREIGN PATENT DOCUMENTS

| | | |
|---|---|---|
| JP | 5668541 B2 | 2/2015 |
| JP | 2018-093614 A | 6/2018 |
| WO | 2011/074330 A1 | 6/2011 |

* cited by examiner

*Primary Examiner* — Brian R Ohara
*Assistant Examiner* — Michelle T Leonard
(74) *Attorney, Agent, or Firm* — Oliff PLC

(57) ABSTRACT

An electric energy storage system includes: an electric energy storage device; and a control device configured to perform charge and discharge control and temperature adjustment control of the electric energy storage device. The electric energy storage device is configured to be electrically connected to a power network. The control device is configured such that execution of the temperature adjustment control of the electric energy storage device is restricted when the control device performs the charge and discharge control so as to alleviate power shortage on the power network according to a request from a management computer for the power network.

5 Claims, 10 Drawing Sheets

| OPERATION MODE | TEMPERATURE ADJUSTMENT STATUS | |
|---|---|---|
| | TEMPERATURE INCREASE FLAG | TEMPERATURE REDUCTION FLAG |
| ON MODE | ON | ON |
| FIRST RESTRICTION MODE (OFF MODE) | OFF | OFF |
| SECOND RESTRICTION MODE | ON | OFF |
| THIRD RESTRICTION MODE | OFF | ON |

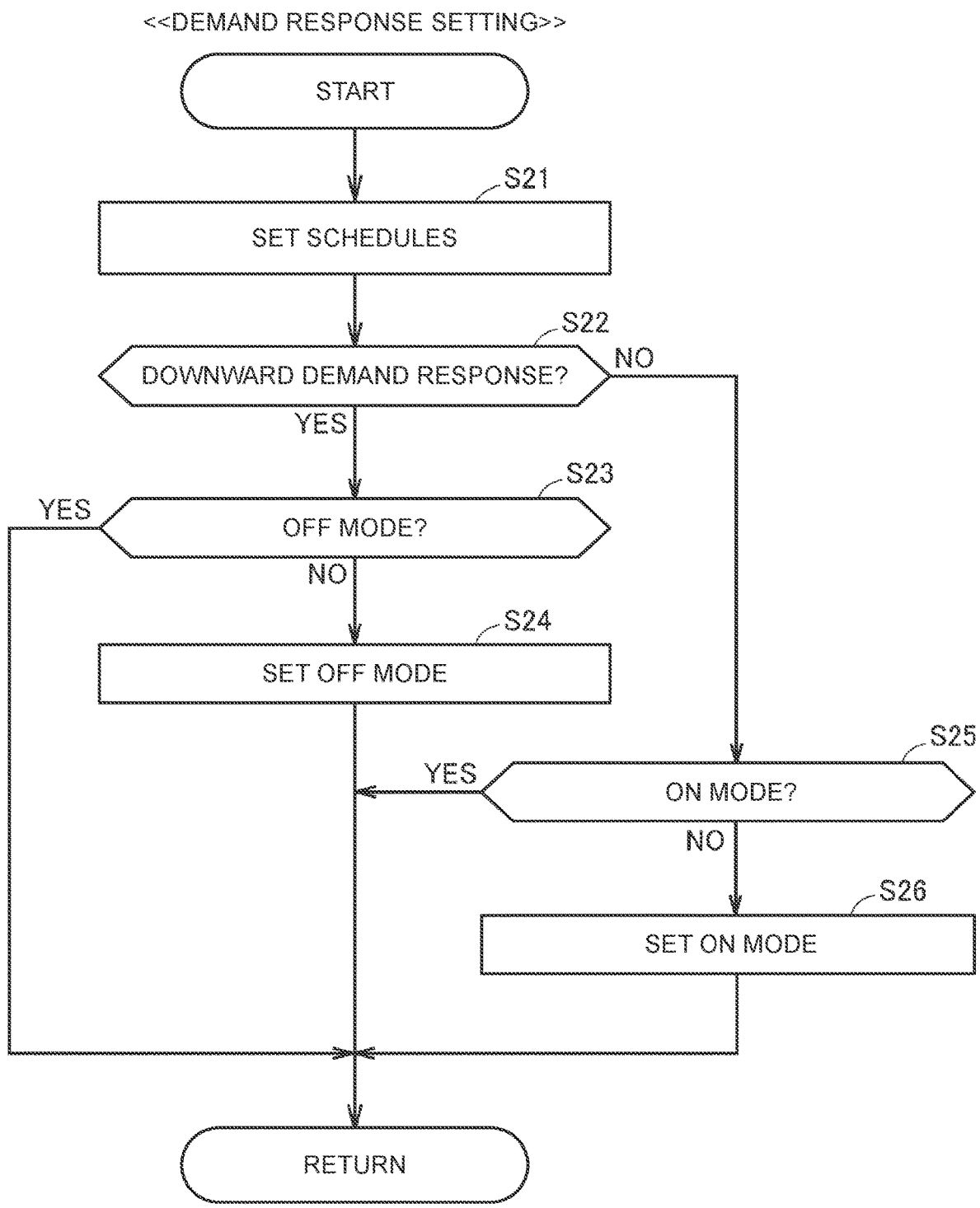

ELECTRIC ENERGY STORAGE SYSTEM AND VEHICLE

CROSS-REFERENCE TO RELATED APPLICATION

This application claims priority to Japanese Patent Application No. 2020-096113 filed on Jun. 2, 2020, incorporated herein by reference in its entirety.

BACKGROUND

1. Technical Field

The present disclosure relates to electric energy storage systems and vehicles.

2. Description of Related Art

Japanese Patent No. 5668541 discloses a technique for a vehicle including a battery (electric energy storage device) and a heater. In this technique, the battery is heated using the heater when the battery temperature falls below a predetermined value.

SUMMARY

Demand response has recently attracted attention as a method for balancing supply and demand on a power network. In demand response, a predetermined request is made to power network customers using a demand response signal. Demand response is divided into two major types: demand response in which alleviation of power shortage (e.g., a reduction in power demand or a reverse power flow) is requested (hereinafter sometimes referred to as "downward demand response"), and demand response in which an increase in power demand is requested (hereinafter also referred to as "upward demand response").

The power network customers (e.g., vehicle users) who complied with the demand response receive incentives from a power network administrator. However, a predetermined penalty is imposed on any customer who agreed to but did not comply with the demand response request.

In the vehicle described in Japanese Patent No. 5668541, battery temperature adjustment control (more specifically, temperature increase control) is performed when the battery temperature falls below the predetermined value. When the battery temperature adjustment control is performed while the battery is not being charged, the amount of electricity stored in the battery may become insufficient, and in a worse case, the battery may become over-discharged as the battery power is consumed to adjust the battery temperature. One possible way to avoid such over-discharge of the battery is to charge the battery using electricity supplied from the power network. However, if such charging of the battery is performed during a period in which alleviation of power shortage on the power network is requested using the demand response signal, it is contrary to the request for downward demand response, and the vehicle user may be penalized.

The present disclosure provides a technique of restraining electricity from being consumed contrary to the request during a period in which alleviation of power shortage on a power network is requested.

An electric energy storage system according to one aspect of the present disclosure includes: an electric energy storage device; and a control device configured to perform charge and discharge control and temperature adjustment control of the electric energy storage device. The electric energy storage device is configured to be electrically connected to a power network. The control device is configured such that execution of the temperature adjustment control is restricted when the control device performs the charge and discharge control so as to alleviate power shortage on the power network according to a request from a management computer for the power network.

In the above electric energy storage system, execution of the temperature adjustment control of the electric energy storage device is restricted when the charge and discharge control is performed so as to alleviate power shortage on the power network according to a request (e.g., request for downward demand response) from the management computer for the power network. Electric power is thus restrained from being consumed for temperature adjustment of the electric energy storage device during a period in which alleviation of power shortage on the power network is requested. According to the above electric energy storage system, electric power is restrained from being consumed contrary to the request during the period in which alleviation of power shortage on the power network is requested.

The control device may be configured to operate in an operation mode selected from modes including an ON mode and an OFF mode. The ON mode may be an operation mode in which execution of the temperature adjustment control is allowed. The OFF mode may be an operation mode in which execution of the temperature adjustment control is prohibited. The control device may be configured such that execution of the temperature adjustment control is restricted by the OFF mode.

In the above electric energy storage system, execution of the temperature adjustment control is restricted (more specifically, prohibited) by the OFF mode. In the above electric energy storage system, the temperature adjustment control can be allowed or prohibited by switching the operation mode between the ON mode and the OFF mode.

The electric energy storage system may further include: the management computer; and a vehicle including the electric energy storage device and the control device. The management computer may be provided outside the vehicle and may be configured to set the operation mode of the control device by wireless communication with the vehicle. The management computer may be configured to set the operation mode of the control device to the OFF mode when the management computer requests a user of the vehicle to perform the charge and discharge control of the electric energy storage device so as to alleviate the power shortage on the power network and the user of the vehicle agrees to the request. The management computer may be configured to set the operation mode of the control device to the ON mode when the management computer requests the user of the vehicle to perform the charge and discharge control of the electric energy storage device so as to increase power demand on the power network and the user of the vehicle agrees to the request.

In the above electric energy storage system, the management computer sets the ON mode or the OFF mode according to the type of request. When the management computer requests alleviation of power shortage, execution of the temperature adjustment control is prohibited to restrain electric power from being consumed contrary to the request. When the management computer requests an increase in power demand, execution of the temperature adjustment control is allowed. The user of the vehicle therefore performs the temperature adjustment control of the electric energy storage device, and the power demand on the power network can thus be increased.

A request signal that is sent from the management computer to the user of the vehicle may be sent to communication equipment mounted on the vehicle the user is riding in or may be sent to a mobile terminal carried by the user. The user may send a signal indicating that he or she agrees to the request from the communication equipment or the mobile terminal to the management computer.

The control device may be configured to perform the charge and discharge control of the electric energy storage device according to a predetermined next charging schedule. The control device may be configured to perform the temperature adjustment control of the electric energy storage device using electric power supplied from the power network at a timing determined based on the predetermined next charging schedule when the vehicle is electrically connected to the power network and the temperature adjustment control is allowed.

In the above electric energy storage system, the control device can perform the temperature adjustment control of the electric energy storage device at the timing according to the next charging schedule. Since the electric power supplied from the power network is used for the temperature adjustment control of the electric energy storage device, the electric energy storage device is less likely to be over-discharged.

The management computer may be configured to perform the charge and discharge control of the electric energy storage device by remotely controlling the control device during a period of an agreed request when the management computer requests the user of the vehicle to adjust the power demand on the power network and the user of the vehicle agrees to the request.

The management computer can perform the charge and discharge control of the electric energy storage device according to the request by remotely controlling the control device during the period of the request. The remotely controlled control device performs the charge and discharge control according to the request to alleviate power shortage, execution of the temperature adjustment control is restrained. Electric power is thus restrained from being consumed for temperature adjustment of the electric energy storage device.

A vehicle according to another aspect of the present disclosure includes: an electric energy storage device; and a control device configured to perform charge and discharge control and temperature adjustment control of the electric energy storage device. The electric energy storage device is configured to be electrically connected to a power network. The temperature adjustment control includes temperature increase control in which a temperature of the electric energy storage device is increased and temperature reduction control in which the temperature of the electric energy storage device is reduced. The control device is configured to operate in a first restriction mode or a second restriction mode during a period in which a management computer for the power network requests alleviation of power shortage on the power network. The first restriction mode is an operation mode in which execution of both the temperature increase control and the temperature reduction control is prohibited. The second restriction mode is an operation mode in which execution of the temperature increase control is allowed and execution of the temperature reduction control is prohibited.

In the above vehicle, execution of the temperature adjustment control of the electric energy storage device is restricted by the first restriction mode or the second restriction mode during the period in which alleviation of power shortage on the power network is requested. According to the above vehicle, electric power is thus restrained from being consumed contrary to the request during the period in which alleviation of power shortage on the power network is requested.

The control device may be configured to operate in the first restriction mode when the temperature of the electric energy storage device is higher than a predetermined temperature during the period in which the management computer for the power network requests the alleviation of the power shortage on the power network, and may be configured to operate in the second restriction mode when the temperature of the electric energy storage device is lower than the predetermined temperature during the period in which the management computer for the power network requests the alleviation of the power shortage on the power network.

The predetermined temperature may be a freezing temperature of the electric energy storage device (i.e., a threshold value between a temperature range in which the electric energy storage device does not freeze and a temperature range in which the electric energy storage device can freeze). For example, the electric energy storage device may freeze in cold areas. When the temperature of the electric energy storage device is lower than the predetermined temperature (e.g., when the electric energy storage device may freeze) during the period in which alleviation of power shortage on the power network is requested, execution of the temperature increase control is allowed. The temperature of the electric energy storage device is therefore less likely to be excessively reduced (e.g., the electric energy storage device is less likely to freeze). When the temperature of the electric energy storage device is higher than the predetermined temperature during the period in which alleviation of power shortage on the power network is requested, execution of both the temperature increase control and the temperature reduction control is prohibited. Electric power is thus more effectively restrained from being consumed contrary to the request during the period in which alleviation of power shortage on the power network is requested.

The above vehicle may further include: an electric heating device configured to heat the electric energy storage device; and an electric cooling device configured to cool the electric energy storage device. The control device may be configured to heat the electric energy storage device by the electric heating device in the temperature increase control. The control device may be configured to cool the electric energy storage device by the electric cooling device in the temperature reduction control.

In the above vehicle, heating of the electric energy storage device and cooling of the electric energy storage device can be separately performed by the heating device and the cooling device. With this configuration, the temperature increase control and the temperature reduction control can be easily independently restricted.

According to the present disclosure, electric power is restrained from being consumed contrary to the request during the period in which alleviation of power shortage on the power network is requested.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is a flowchart of a process that is executed when a management computer for a power network according to the embodiment of the present disclosure makes a PG adjustment request;

FIG. 6 is a detailed flowchart of a process for schedule setting and operation mode setting in the process of FIG. 5;

DETAILED DESCRIPTION OF EMBODIMENTS

Figure 1:
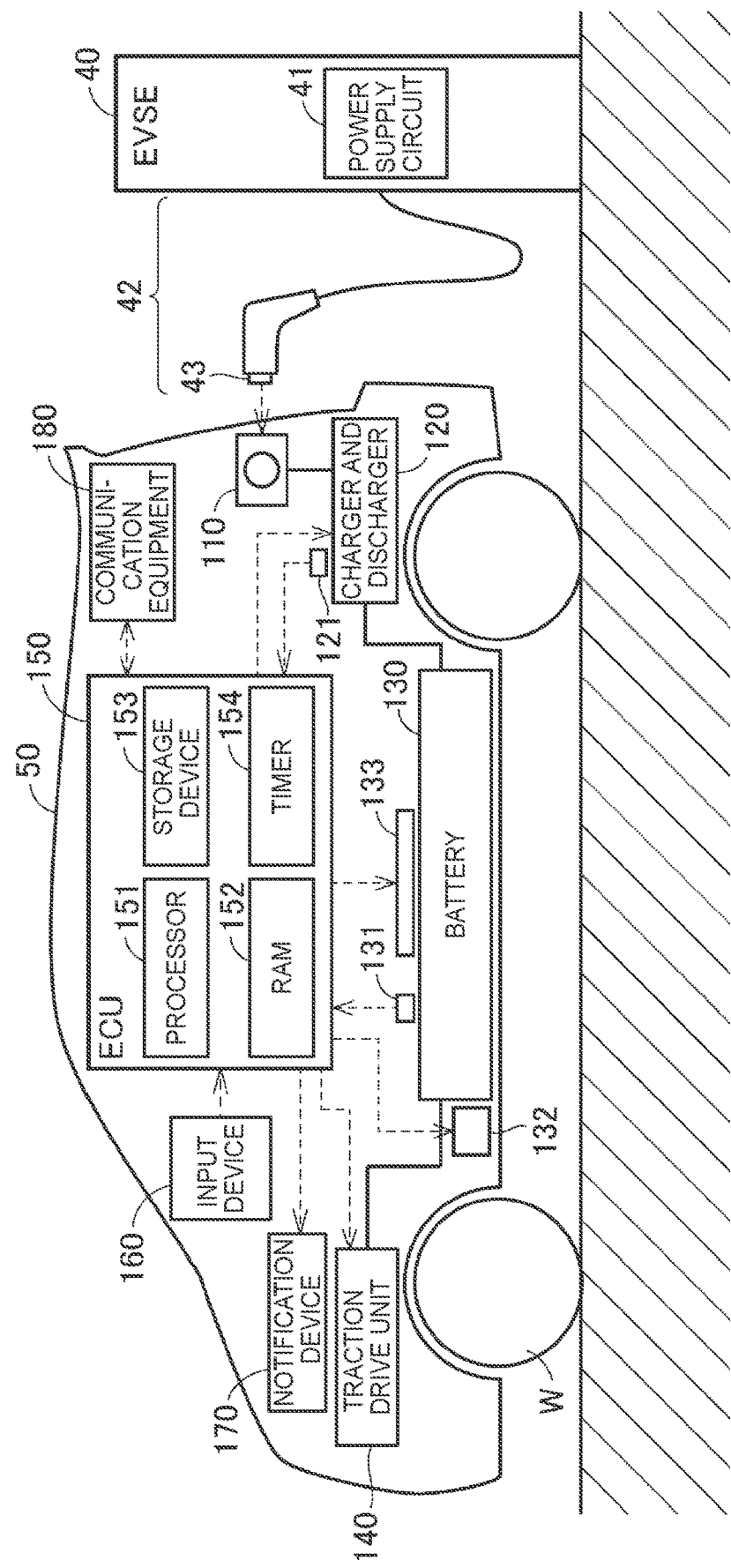
FIG. 1 illustrates the configuration of a vehicle included in an electric energy storage system according to an embodiment of the present disclosure.

An embodiment of the present disclosure will be described in detail with reference to the accompanying drawings. In the drawings, the same or corresponding parts are denoted by the same signs, and description thereof will not be repeated.

An electric energy storage system according to the embodiment includes a plurality of electric vehicles. The electric vehicles in the electric energy storage system may have different configurations from each other. However, it is assumed in the embodiment that each electric vehicle in the electric energy storage system has a configuration shown in FIG. 1. Hereinafter, each of the electric vehicles included in the electric energy storage system will be referred to as the "vehicle 50," and each of EVSEs included in the electric energy storage system will be referred to as the "EVSE 40" unless individually identified. EVSE stands for electric vehicle supply equipment.

FIG. 1 illustrates the configuration of the vehicle 50 included in the electric energy storage system according to the embodiment. Referring to FIG. 1, the vehicle 50 includes a battery 130 that stores electric power for traction. The battery 130 includes a secondary battery such as, e.g., a lithium ion battery or a nickel-metal hydride battery. In the embodiment, the secondary battery is a battery pack including a plurality of lithium ion cells. The battery pack is composed of a plurality of single cells (typically also referred to as "cells") electrically connected to each other. Other electric energy storage devices such as an electric double layer capacitor may be used instead of the secondary battery. The battery 130 according to the embodiment is an example of the "electric energy storage device" according to the present disclosure.

The vehicle 50 includes an electronic control unit (ECU) 150. The ECU 150 is configured to perform charge control and discharge control of the battery 130. The ECU 150 is also configured to control communication of the vehicle 50 with the outside. The vehicle 50 may be either an electric vehicle (EV) that can run only on electric power stored in the battery 130 or a plug-in hybrid vehicle (PHV) that can run on both electric power stored in the battery 130 and output of an engine (not shown). In the embodiment, the vehicle 50 is driven by a user. However, the vehicle 50 may be configured to drive autonomously. The ECU 150 according to the embodiment is an example of the "control device" according to the present disclosure.

The vehicle 50 further includes a monitoring module 131 that monitors the state of the battery 130. The monitoring module 131 includes various sensors that detect the state of the battery 130 (e.g., voltage, current, and temperature). The monitoring module 131 outputs the detection results of the sensors to the ECU 150. The monitoring module 131 may be a battery management system (BMS) having a state of charge (SOC) estimation function, a state of health (SOH) estimation function, a cell voltage equalization function, a diagnosis function, and a communication function in addition to the functions of the sensors. The ECU 150 can acquire the state of the battery 130 (e.g., temperature, current, voltage, SOC, and internal resistance) based on the output of the monitoring module 131.

The vehicle 50 further includes an electric cooling device 132 configured to cool the battery 130. In the embodiment, the cooling device 132 is an air moving device such as a fan or a blower. The vehicle 50 further includes an electric heating device 133 configured to heat the battery 130. In the embodiment, the heating device 133 is an electric heater. The ECU 150 controls the cooling device 132 and the heating device 133. While the vehicle 50 is traveling, each of the cooling device 132 and the heating device 133 is driven by electric power supplied from an auxiliary battery, not shown. When the battery 130 is electrically connected to the EVSE 40, each of the cooling device 132 and the heating device 133 is driven by electric power supplied from the EVSE 40. The electric power from the EVSE 40 may be supplied to each of the cooling device 132 and the heating device 133 after being transformed by a power conversion circuit (not shown) of the vehicle 50.

The vehicle 50 further includes an inlet 110 and a charger and discharger 120 that are compatible with the power supply method of the EVSE 40. The inlet 110 is configured to receive electric power supplied from the outside of the vehicle 50. The inlet 110 is also configured to output to the outside of the vehicle 50 electric power supplied from the charger and discharger 120. Although FIG. 1 shows only the inlet 110 and the charger and discharger 120, the vehicle 50 may include a plurality of inlets and a plurality of chargers and dischargers, one each for each power supply method, so that the vehicle 50 is compatible with a plurality of power supply methods (e.g., an alternating current (AC) method and a direct current (DC) method).

The EVSE 40 includes a power supply circuit 41. A charging cable 42 is connected to the EVSE 40. The charging cable 42 may always be connected to the EVSE 40 or may be detachable from the EVSE 40. The charging cable 42 has a connector 43 at its tip end and has a power line inside. The connector 43 of the charging cable 42 can be connected to the inlet 110. The EVSE 40 and the vehicle 50 are electrically connected by connecting the connector 43 of the charging cable 42 connected to the EVSE 40 to the inlet 110 of the vehicle 50. Electric power can thus be supplied from the EVSE 40 to the vehicle 50 through the charging cable 42.

The charger and discharger 120 is located between the inlet 110 and the battery 130. The charger and discharger 120 includes a relay that connects and disconnects an electric power path from the inlet 110 to the battery 130 and a power conversion circuit (e.g., a bidirectional converter) (both not shown). The ECU 150 controls the relay and the power conversion circuit that are included in the charger and discharger 120. The vehicle 50 further includes a monitoring module 121 that monitors the state of the charger and discharger 120. The monitoring module 121 includes various sensors that detect the state of the charger and discharger 120 (e.g., voltage, current, and temperature). The monitoring module 121 outputs the detection results of the sensors to the ECU 150. In the embodiment, the monitoring module 121 is configured to detect the voltage and current that are input to the power conversion circuit and the voltage and current that are output from the power conversion circuit.

Electric power can be transferred between the EVSE 40 and the vehicle 50 when the EVSE 40 located outside the vehicle 50 and the inlet 110 are connected via the charging cable 42. The vehicle 50 can thus perform external charging (that is, the battery 130 of the vehicle 50 can be charged with electric power supplied from the outside of the vehicle 50). The electric power for external charging is supplied from, e.g., the EVSE 40 to the inlet 110 through the charging cable 42. The charger and discharger 120 is configured to convert the electric power received by the inlet 110 to electric power suitable for charging the battery 130 and output the converted electric power to the battery 130. The vehicle 50 can also perform external power feeding (that is, electric power can be supplied from the vehicle 50 to the EVSE 40 via the charging cable 42) when the EVSE 40 and the inlet 110 are connected via the charging cable 42. The electric power for external power feeding is supplied from the battery 130 to the charger and discharger 120. The charger and discharger 120 is configured to convert the electric power supplied from the battery 130 to electric power suitable for external power feeding and output the converted electric power to the inlet 110. The relay of the charger and discharger 120 is closed (connected) when the vehicle 50 performs either external charging or external power feeding. The relay of the charger and discharger 120 is opened (disconnected) when the vehicle 50 performs neither external charging nor external power feeding.

The configuration of the charger and discharger 120 is not limited to the above configuration and may be modified as appropriate. The charger and discharger 120 may include, e.g., at least one of a rectifier circuit, a power factor correction (PFC) circuit, an isolation circuit (e.g., an isolation transformer), an inverter, and a filter circuit. In the case where the vehicle 50 performs external power feeding to an AC EVSE, the charger and discharger 120 may convert DC power discharged from the battery 130 to AC power and this AC power may be supplied from the vehicle 50 to the EVSE.

In the case where the vehicle 50 performs external power feeding to a DC EVSE, the vehicle 50 may supply DC power to the EVSE and an inverter included in the EVSE may convert the DC power to AC power. The DC EVSE standard may be any of CHAdeMO, Combined Charging System (CCS), GB/T, and Tesla.

The ECU 150 includes a processor 151, a random access memory (RAM) 152, a storage device 153, and a timer 154. The processor 151 is, e.g., a central processing unit (CPU). The RAM 152 functions as a working memory for temporarily storing data to be processed by the processor 151. The storage device 153 is configured to save stored information. The storage device 153 includes, e.g., a read only memory (ROM) and a rewritable nonvolatile memory. The storage device 153 has stored therein programs and information to be used by the programs (e.g., maps, numerical formulas, and various parameters). In the embodiment, various controls in the ECU 150 are performed by the processor 151 executing the programs stored in the storage device 153. However, the various controls in the ECU 150 need not necessarily be performed by software, and may be performed by dedicated hardware (an electronic circuit). The ECU 150 may include any number of processors. The ECU 150 may include one processor for each predetermined control.

The timer 154 is configured to notify the processor 151 when a set time comes. When the time set on the timer 154 comes, the timer 154 sends to the processor 151 a signal notifying that the set time has come. In the embodiment, the timer 154 is a timer circuit. However, the timer 154 may be implemented by software instead of hardware (timer circuit). The ECU 150 can acquire the current time using a real-time clock (RTC) circuit (not shown) included in the ECU 150.

The vehicle 50 further includes a traction drive unit 140, an input device 160, a notification device 170, communication equipment 180, and drive wheels W. The vehicle 50 is not limited to front-wheel drive shown in FIG. 1, and may be rear-wheel drive or four-wheel drive.

The traction drive unit 140 includes a power control unit (PCU) and a motor generator (MG), both not shown, and is configured to drive the vehicle 50 using the electric power stored in the battery 130. The PCU includes: e.g., a control device including a processor; an inverter; a converter; and a relay (hereinafter referred to as the "system main relay (SMR)") (none of which are shown). The control device of the PCU is configured to receive instructions (control signals) from the ECU 150 and control the inverter, converter, and SMR of the PCU according to the instructions. The MG is, e.g., a three-phase AC motor generator. The MG is configured to be driven by the PCU to rotate the drive wheels W. The MG is also configured to regeneratively generate electric power and supply the generated electric power to the battery 130. The SMR is configured to connect and disconnect an electric power path from the battery 130 to the PCU. The SMR is closed (connected) when the vehicle 50 is traveling.

The input device 160 is a device that accepts input from the user. The input device 160 is operated by the user and outputs signals corresponding to the user's operation to the ECU 150. The communication may be either wired or wireless. Examples of the input device 160 include various switches, various pointing devices, a keyboard, and a touch panel. The input device 160 may be an operation unit of a car navigation system. The input device 160 may be a smart speaker that accepts voice input.

The notification device 170 is configured to perform a predetermined notification process to give notifications to the user (e.g., an occupant of the vehicle 50) as requested by the ECU 150. The notification device 170 may include at least one of a display device (e.g., a touch panel display), a speaker, and a lamp (e.g., a malfunction indicator lamp (MIL)). The notification device 170 may be a meter panel, a head-up display, or a car navigation system.

The communication equipment 180 includes various communication interfaces (I/Fs). The communication equipment 180 may include a Data Communication Module (DCM). The communication equipment 180 may include a communication I/F compatible with the fifth generation mobile communication system (5G). The ECU 150 is configured to wirelessly communicate with a communication device outside the vehicle 50 via the communication equipment 180.

Figure 2:
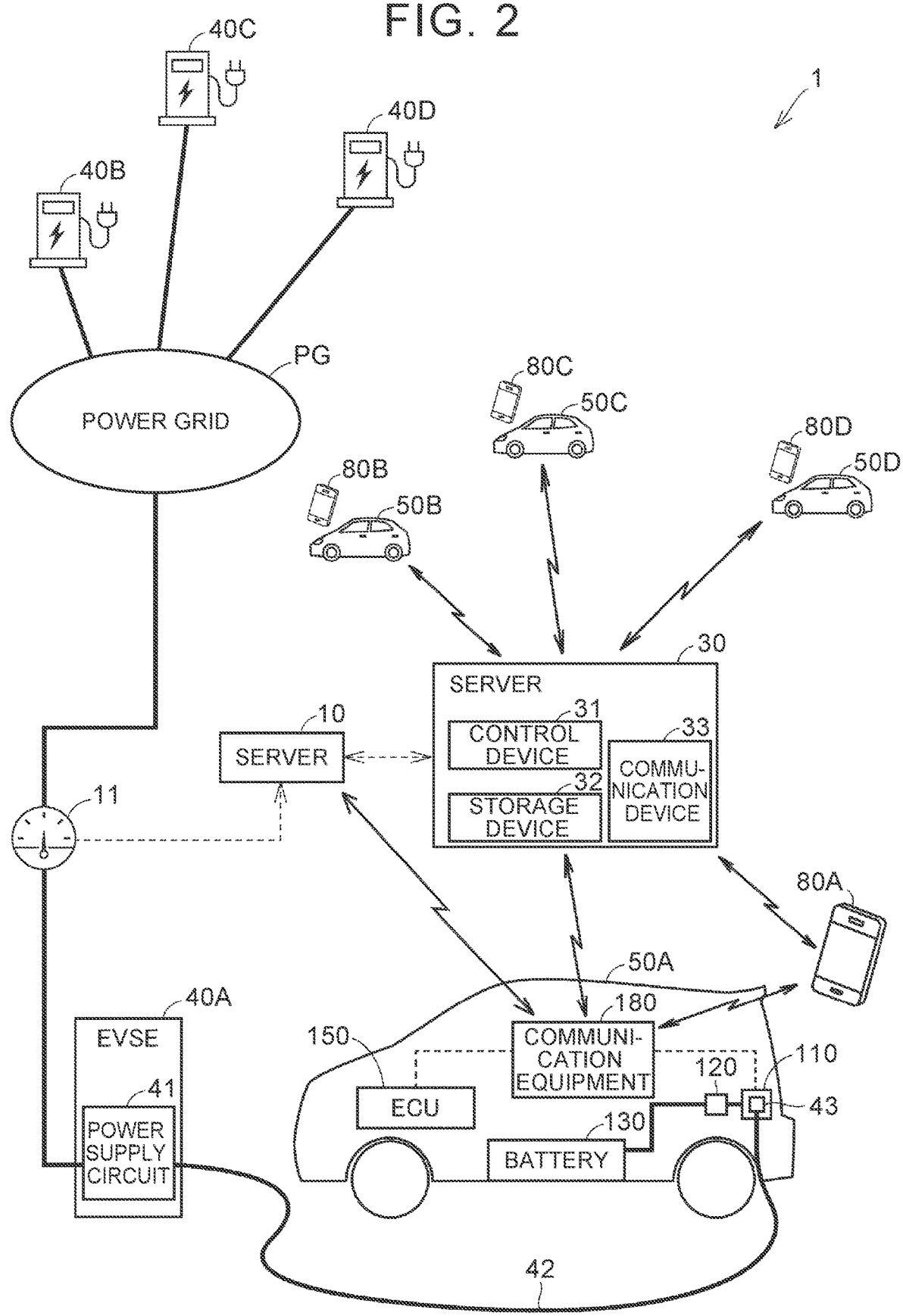
FIG. 2 illustrates a schematic configuration of the electric energy storage system according to the embodiment of the present disclosure.

FIG. 2 illustrates a schematic configuration of the electric energy storage system according to the embodiment. Referring to FIG. 2, in the embodiment, a power grid PG, servers 10, 30, a smart meter 11, EVSEs 40A to 40D, and vehicles 50A to 50D, and mobile terminals 80A to 80D form a vehicle-grid integration (VGI) system 1. Each of the vehicles 50A to 50D has the configuration shown in FIG. 1. The VGI system 1 according to the embodiment is an example of the "electric energy storage system" according to the present disclosure.

In FIG. 2, the mobile terminals 80A to 80D are mobile terminals carried by users of the vehicles 50A to 50D, respectively. Hereinafter, each of the mobile terminals 80A to 80D will be referred to as the "mobile terminal 80" unless individually identified. In the embodiment, the mobile terminals 80 are smartphones with a touch panel display. However, the mobile terminals 80 are not limited to the smartphones with a touch panel display and may be any mobile terminals. For example, the mobile terminals 80 may be tablets, smartphones, wearable devices (e.g., smartwatches), or electronic keys.

Although FIG. 2 shows four vehicles, four mobile terminals, and four EVSEs, the numbers of vehicles, mobile terminals, and EVSEs included in the VGI system 1 are independent of each other and can be determined as desired. The VGI system 1 may include 10 or more vehicles, 10 or more mobile terminals, and 10 or more EVSEs, or may include 100 or more vehicles, 100 or more mobile terminals, and 100 or more EVSEs. The VGI system 1 may include either or both of a personally owned vehicle (POV) and a vehicle managed by a Mobility as a Service (Maas) provider (MaaS vehicle). The VGI system 1 may include either or both of a non-public EVSE that can only be used by a specific user (e.g., a home EVSE) and a public EVSE that can be used by a large, unspecified number of users.

The vehicle 50A shown in FIG. 2 is electrically connected to the EVSE 40A. In the embodiment, the EVSE 40A is an AC charging facility (e.g., a standard charger) with reverse power flow capability. However, the VGI system 1 may include a charging facility with no reverse power flow capability, or may include a DC charging facility (e.g., a quick charger). When the connector 43 of the charging cable 42 connected to the EVSE 40A is connected to the inlet 110 of the vehicle 50A, the vehicle 50A and the EVSE 40A can communicate with each other, and electric power can also be transferred between the EVSE 40A and the vehicle 50A. The vehicle 50A electrically connected to the EVSE 40A is electrically connected to the power grid PG via the EVSE 40A. The vehicle 50A is thus ready for external charging and external power feeding. The communication equipment 180 mounted on the vehicle 50A is configured to communicate with the EVSE 40A via the charging cable 42. The EVSE 40A and the vehicle 50A may communicate with each other by any communication method. For example, the EVSE 40A and the vehicle 50A may communicate with each other by a controller area network (CAN) or power line communication (PLC). The standard for communication between the EVSE 40A and the vehicle 50A may be International Organization for Standardization (ISO)/International Electrotechnical Commission (IEC) 15118 or IEC 61851.

The vehicle 50 starts external charging when an external charging start condition is satisfied after the vehicle 50 is ready for external charging (e.g., the state of the vehicle 50A shown in FIG. 2). In the embodiment, the external charging start condition is satisfied when the start time of the next charging schedule registered in the storage device 153 (FIG. 1) comes. The user may set a timer charging schedule (e.g., start time and end time) in the ECU 150 via the input device 160. A demand response schedule that will be described later may be set in the ECU 150. When the timer charging schedule or the demand response schedule is set in the ECU 150, the set schedule is registered in the storage device 153 as a charging schedule. Of all the registered charging schedules, one with the earliest start time is the next charging schedule. In the case where the next charging schedule has not been registered, an immediate charging start condition is satisfied when the connector 43 of the charging cable 42 connected to the EVSE 40 is connected to the inlet 110 of the vehicle 50. Immediate charging refers to external charging that is started as soon as the vehicle 50 is ready for external charging. The external charging start condition may be satisfied when the user performs a predetermined charging start operation on the EVSE 40 or the vehicle 50. The charging start operation can be set as desired. For example, the charging start operation may be the user's operation of pressing a predetermined button.

The vehicle 50 starts external power feeding when an external power feeding start condition is satisfied after the vehicle 50 is ready for external power feeding (e.g., the state of the vehicle 50A shown in FIG. 2). When a demand response schedule that will be described later is set in the ECU 150, the set demand response schedule is registered in the storage device 153 as a power feeding schedule. Of all the registered power feeding schedules, one with the earliest start time is the next power feeding schedule. In the embodiment, the external power feeding start condition is satisfied when the start time of the next power feeding schedule comes. The external power feeding start condition may be satisfied when the user performs a predetermined power feeding start operation on the EVSE 40 or the vehicle 50. The power feeding start operation can be set as desired. For example, the power feeding start operation may be the user's operation of pressing a predetermined button.

The power supply circuit 41 included in the EVSE 40A is electrically connected to the power grid PG via the smart meter 11. For example, the battery 130 is externally charged when electric power is supplied from the power grid PG to the vehicle 50A via the power supply circuit 41 and the charging cable 42. When the vehicle 50A performs external power feeding to the EVSE 40A, electric power can be reversely supplied from the vehicle 50A to the power grid PG via the charging cable 42 and the power supply circuit 41. The power supply circuit 41 converts the electric power supplied from the power grid PG to electric power suitable for external charging, and also converts the electric power supplied from the vehicle 50A to electric power suitable for reverse power flow.

The smart meter 11 is configured to measure the amount of electric power supplied from the EVSE 40A to the vehicle 50A. The smart meter 11 is also configured to measure the amount of electric power reversely supplied from the vehicle 50A to the EVSE 40A. The smart meter 11 is configured to measure power usage at predetermined time intervals (e.g., every 30 minutes) and store the measured power usage therein and send the measured power usage to the server 10. A communication protocol between the smart meter 11 and the server 10 is, e.g., IEC (Device Language Message Specification/Companion Specification for Energy Metering) (DLMS/COSEM). The server 10 sends the measured value of the smart meter 11 to the server 30 as needed. The server 10 may send the measured value of the smart meter 11 to the server 30 either periodically or as requested by the server 30.

The communication equipment 180 mounted on each vehicle 50 included in the VGI system 1 is configured to wirelessly communicate with the server 30 via, e.g., a mobile network (telematics). Signals that are transferred between the communication equipment 180 and the server 30 may be encrypted signals. In the embodiment, the communication equipment 180 mounted on the vehicle 50A and the mobile terminal 80A are configured to wirelessly communicate with each other. The ECU 150 can control the mobile terminal 80A by wireless communication to cause the mobile terminal 80A to give notifications to the user. The communication equipment 180 and the mobile terminal 80A may communicate with each other by short-range communication (e.g., direct communication inside and around the vehicle) such as Bluetooth (registered trademark).

The mobile terminal 80 has predetermined application software (hereinafter simply referred to as the "app") installed therein. The mobile terminal 80 is carried by the user of the vehicle 50 and can send and receive information to and from the server 30 via the app. The user can operate the app via the touch panel display (not shown) of the mobile terminal 80. The touch panel display of the mobile terminal 80 is configured to give notifications to the user of the vehicle 50.

In the embodiment, the VGI system 1 functions as a virtual power plant (VPP). The VPP is a system that aggregates a large number of distributed energy resources (hereinafter also referred to as the "DERs") by advanced energy management technology using the Internet of Things (IoT) and performs remote integrated control of the DERs to cause the DERs to function as if they were a single power plant. An example of the DERs is energy resources owned by customers (hereinafter also referred to as the "demand-side resources (DSRs)"). In the VGI system 1, the DSRs for implementing the VPP are electric vehicles equipped with an electric energy storage device (i.e., the vehicles 50 shown in FIG. 1).

In the VPP, an electric utility that aggregates the DERs and provides energy management services is called an "aggregator." An electric power company can work with, e.g., the aggregator to balance supply and demand of electric power by demand response.

The server 10 is a server that belongs to a power transmission and distribution business operator. In the embodiment, the electric power company serves as both a power producer and a power transmission and distribution business operator. The electric power company constructs a power network (i.e., the power grid PG) by power plants and power transmission and distribution facilities, both not shown, and maintains and manages the server 10, the smart meter 11, the EVSEs 40A to 40D, and the power grid PG. The electric power company can make a profit by, e.g., doing business with customers (e.g., individuals or companies) who use electric power. In the embodiment, the electric power company is a grid operator who operates the power grid PG. The power grid PG according to the embodiment is an example of the "power network" according to the present disclosure.

The server 30 is configured to communicate with the server 10, the vehicles 50A to 50D, and the mobile terminals 80A to 80D. The server 30 is a server that belongs to the aggregator. The aggregator carries out work for management of the power grid PG as instructed by the electric power company. The server 30 is a management computer for the power grid PG. The server 10 and the server 30 are configured to communicate with each other via, e.g., a virtual private network (VPN). A communication protocol between the server 10 and the server 30 may be OpenADR. In the embodiment, a terminal of the aggregator (e.g., the server 30) is configured to communicate with a terminal of the electric power company (e.g., the server 10) and a terminal of each vehicle user (e.g., the communication equipment 180 and the mobile terminal 80). However, the present disclosure is not limited to this, and the VGI system 1 may include separate servers for communication with the electric power company and communication with the vehicle users. These servers may be managed by different electric utilities (e.g., upper and lower aggregators).

The server 30 includes a control device 31, a storage device 32, and a communication device 33. The control device 31 includes a processor and is configured to perform predetermined information processing and control the communication device 33. The storage device 32 is configured to save various kinds of information. The communication device 33 includes various communication I/Fs. The control device 31 is configured to communicate with the outside via the communication device 33.

The server 10 is configured to perform load leveling using demand response. When the server 10 performs load leveling, the server 10 first sends a signal requesting participation in demand response (hereinafter also referred to as the "demand response participation request") to a plurality of aggregator servers (including the server 30). The demand response participation request includes a target area for demand response, the type of demand response (e.g., downward demand response or upward demand response), and a demand response period. The demand response period is information indicating a demand response start time and a demand response end time. The server 30 is configured to obtain demand response availability (i.e., the amount of electric power that can be adjusted according to demand response) and send the obtained demand response availability to the server 10 in response to a demand response participation request received from the server 10. The server 30 can obtain the demand response availability based on, e.g., the total of demand response capacities (i.e., power adjustment capabilities) of customers within the aggregator's territory.

The server 10 determines the amount of demand response for each aggregator (i.e., the amount of power adjustment to be requested to each aggregator) based on the demand response availabilities received from each aggregator server, and sends a signal instructing to execute demand response (hereinafter also referred to as the "demand response execution instruction") to each aggregator server (including the server 30). The demand response execution instruction includes a target area for demand response, the type of demand response (e.g., downward demand response or upward demand response), the amount of demand response for the aggregator, and a demand response period. When the server 30 receives the demand response execution instruction, the server 30 allocates the amount of demand response to each vehicle 50 available for demand response among the vehicles 50 within the aggregator's territory, produces a demand response signal for each vehicle 50, and sends the demand response signals to the vehicles 50. The demand response signal includes a demand response schedule. The demand response schedule is information indicating a charging profile (e.g., transition of charging power) or a discharging profile (e.g., transition of discharging power) during the demand response period. The server 30 sends the demand response signal to each vehicle 50 that agreed to participate in demand response. When the vehicle 50 receives the demand response signal, the demand response schedule indicated by the demand response signal is set in the ECU 150.

The demand response signal may be a price signal that encourages the user of the vehicle 50 to help balance supply and demand of electric power. The price signal may include the type of demand response (e.g., downward demand response or upward demand response), the demand response schedule for the vehicle 50, and incentive information. The price signal may be sent to the mobile terminal 80 instead of or in addition to the vehicle 50. The demand response signal may be a charge command or a power feed command for the server 30 to directly control the vehicle 50. When the vehicle 50 allows remote control (e.g., dispatching by the server 30), the server 30 can directly control the vehicle 50 by sending the charge command or the power feed command to the vehicle 50 during the demand response period.

The electric utility (e.g., the electric power company or the aggregator) can request the users of the vehicles 50 to help balance supply and demand on the power grid PG by sending the demand response signals. In some cases, the demand response signals are sent from the server 30 to the vehicles 50 according to the demand response execution instruction, as described above. In other cases, the demand response signals are sent from the server 30 to the vehicles 50 based on electricity market information. The ECU 150 is configured to receive the demand response signal from the outside of the vehicle 50 via the communication equipment 180. The user of the vehicle 50 may receive the demand response signal by the mobile terminal 80.

When the ECU 150 and/or the mobile terminal 80 receive(s) the demand response signal, the user of the vehicle 50 can contribute to balancing supply and demand on the power grid PG as requested by the electric utility by performing external charging or external power feeding according to the demand response signal using the EVSE 40 and the vehicle 50. In the embodiment, when the user of the vehicle 50 contributed to balancing supply and demand on the power grid PG as requested by the electric utility, the electric utility pays an incentive for the contribution to the user of the vehicle 50 according to the agreement between the user of the vehicle 50 and the electric utility. However, the electric utility imposes a predetermined penalty on any user who agreed to but did not comply with the demand response request.

For example, the contribution is the amount of electric power adjusted by external charging or external power feeding performed according to the demand response signal. In the embodiment, the contribution is measured using the smart meter 11. However, the electric utility need not necessarily measure the contribution using the smart meter 11 and may measure the contribution by any method. The electric utility may obtain the contribution using the measured value of an electricity meter (not shown) included in the EVSE 40. The electric utility may obtain the contribution using the measured value of a sensor mounted on the vehicle 50. The electric utility may obtain the contribution based on the amount of electric power measured by a portable charging cable with a meter function.

In the embodiment, the server 30 and the EVSE 40 do not communicate with each other. However, the server 30 and the EVSE 40 may be configured to communicate with each other. The server 30 may be configured to communicate with the vehicle 50 via the EVSE 40. The EVSE 40 may be configured to communicate with an EVSE management cloud. A communication protocol between the EVSE 40 and the EVSE management cloud may be Open Charge Point Protocol (OCPP).

Figure 3:
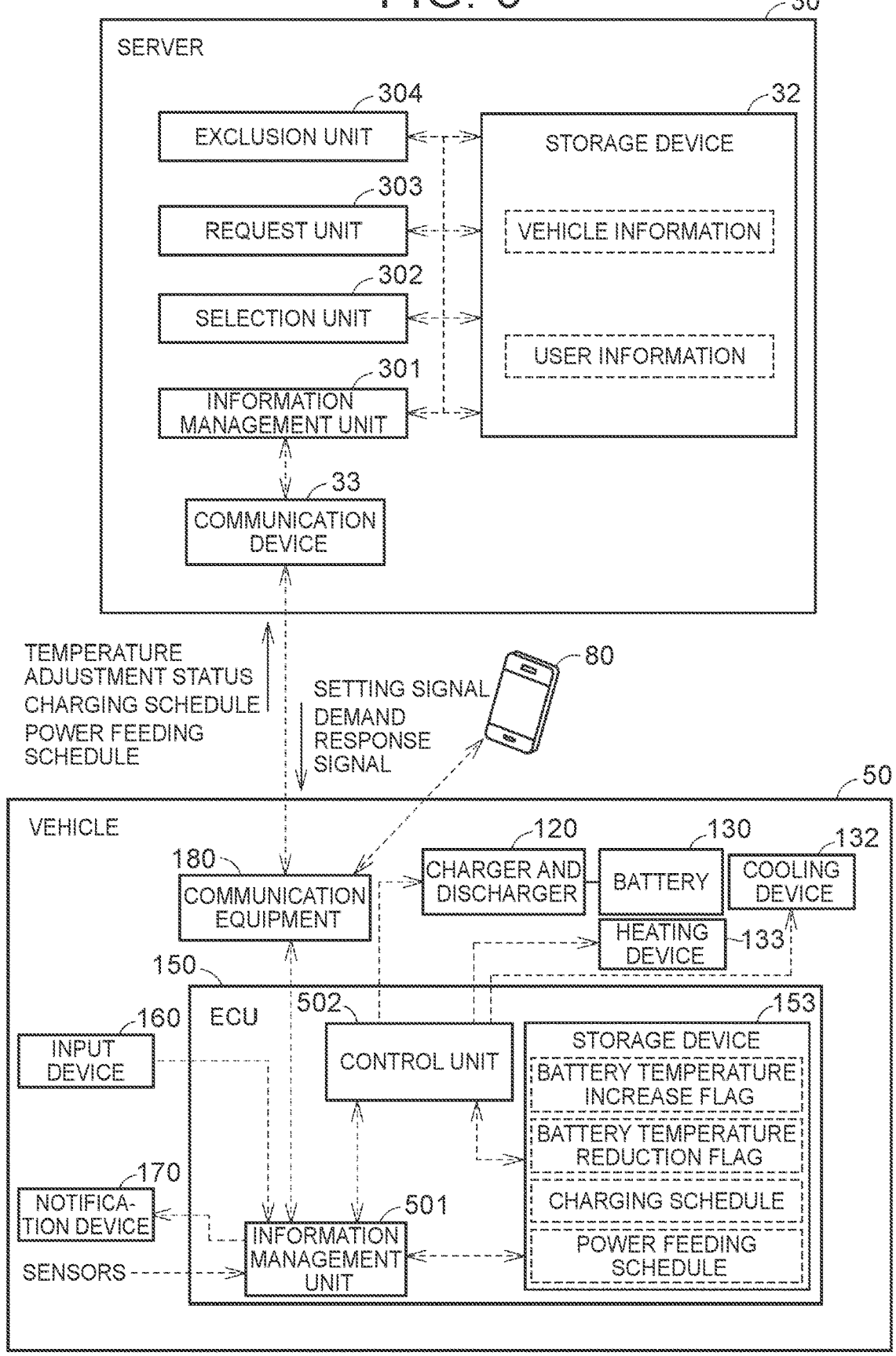
FIG. 3 illustrates a detailed configuration of a vehicle control device and a server that are included in the electric energy storage system according to the embodiment of the present disclosure.

FIG. 3 illustrates detailed configurations of the ECU 150 of the vehicle 50 and the server 30. Referring to FIG. 3 together with FIGS. 1 and 2, the ECU 150 includes an information management unit 501 and a control unit 502. Each of these units of the ECU 150 according to the embodiment is implemented by the processor 151 shown in FIG. 1 and programs that are executed by the processor 151 (e.g., the programs stored in the storage device 153). However, the present disclosure is not limited to this, and each of these units may be implemented by dedicated hardware (electronic circuit).

The information management unit 501 is configured to update information (e.g., control parameters and flags) in the storage device 153 based on given information. The information management unit 501 is also configured to cause the notification device 170 to output predetermined information. An output signal of the input device 160, detection results of various sensors mounted on the vehicle 50, and information received by the communication equipment 180 from the outside of the vehicle 50 are input to the information management unit 501.

The information management unit 501 is configured to acquire the state of the vehicle 50 (e.g., the state of the charger and discharger 120, the temperature and SOC of the battery 130, and the temperature adjustment status) and send the acquired state to the server 30. The information management unit 501 acquires the state of the charger and discharger 120 based on, e.g., the output of the monitoring module 121 (FIG. 1). The information management unit 501 acquires the temperature and SOC of the battery 130 based on, e.g., the output of the monitoring module 131 (FIG. 1). The SOC can be measured by, e.g., a current integration method or an open circuit voltage (OCV) estimation method. The temperature adjustment status is the values (on, off) of a battery temperature increase flag and a battery temperature reduction flag that are stored in the storage device 153. The battery temperature increase flag and the battery temperature reduction flag will be described in detail later (see FIG. 4). The timing at which the information management unit 501 sends the state of the vehicle 50 to the server 30 can be set as desired. The information management unit 501 may serially send the above information indicating the state of the vehicle 50 to the server 30 in real time. Alternatively, the information management unit 501 may send data accumulated in the storage device 153 to the server 30 at a predetermined timing (e.g., when the vehicle 50 finishes traveling or when the charging connector is connected to the vehicle 50).

The control unit 502 is configured to perform charge and discharge control of the battery 130 by controlling the charger and discharger 120. The control unit 502 starts external charging when the external charging start condition described above is satisfied after the vehicle 50 is ready for external charging. The control unit 502 starts external power feeding when the external power feeding start condition described above is satisfied after the vehicle 50 is ready for external power feeding.

The control unit 502 is configured to perform temperature adjustment control of the battery 130 by controlling the cooling device 132 and the heating device 133. The temperature adjustment control includes temperature increase control in which the temperature of the battery 130 is increased and temperature reduction control in which the temperature of the battery 130 is reduced. In the embodiment, the battery temperature increase flag and the battery temperature reduction flag are stored in the storage device 153. The battery temperature increase flag indicates whether execution of the temperature increase control is allowed or prohibited, and the battery temperature reduction flag indicates whether execution of the temperature reduction control is allowed or prohibited. The control unit 502 operates in an operation mode according to the temperature adjustment status (that is, the values of the battery temperature increase flag and the battery temperature reduction flag).

Figure 4:
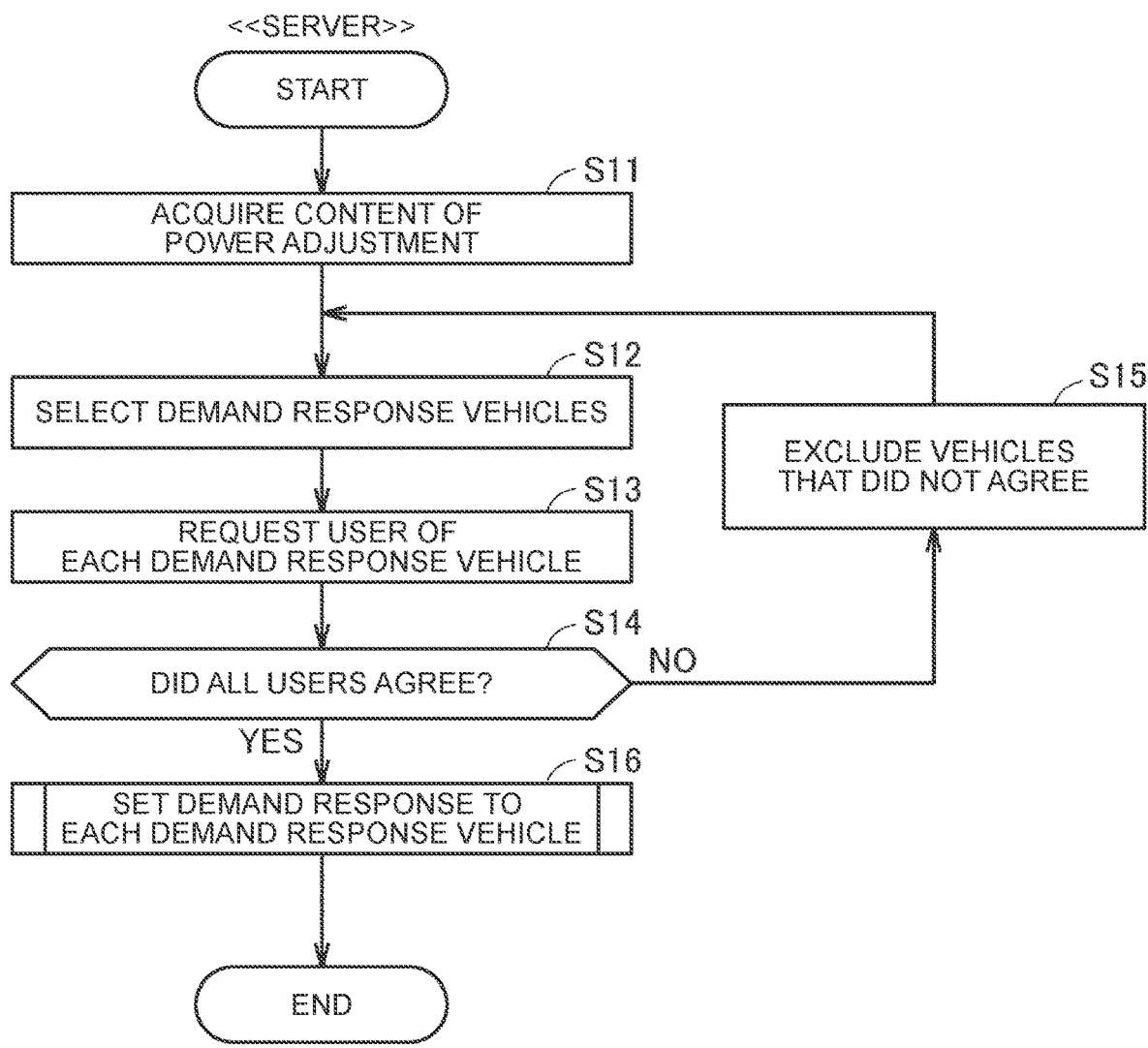
FIG. 4 illustrates operation modes of the vehicle control device according to the embodiment of the present disclosure.

FIG. 4 illustrates the operation modes of the control unit 502. Referring to FIG. 4, the operation mode of the control unit 502 is an ON mode when both the battery temperature increase flag and the battery temperature reduction flag are on. The ON mode is an operation mode in which execution of both the temperature increase control and the temperature reduction control is allowed. In the ON mode, execution of the temperature adjustment control by the control unit 502 is not restricted. The operation mode of the control unit 502 is a first restriction mode (hereinafter also referred to as the "OFF mode") when both the battery temperature increase flag and the battery temperature reduction flag are off. The first restriction mode (OFF mode) is an operation mode in which execution of both the temperature increase control and the temperature reduction control is prohibited. The operation mode of the control unit 502 is a second restriction mode when the battery temperature increase flag is on and the battery temperature reduction flag is off. The second restriction mode is an operation mode in which execution of the temperature increase control is allowed and execution of the temperature reduction control is prohibited. The operation mode of the control unit 502 is a third restriction mode when the battery temperature increase flag is off and the battery temperature reduction flag is on. The third restriction mode is an operation mode in which execution of the temperature increase control is prohibited and execution of the temperature reduction control is allowed.

Referring back to FIG. 3 together with FIGS. 1 and 2, the user can set the battery temperature increase flag and the battery temperature reduction flag to on or off via the input device 160 or the mobile terminal 80. The setting (on, off) of the battery temperature increase flag and the battery temperature reduction flag is changed according to a setting signal (see S16 in FIG. 5) that will be described later.

The server 30 includes an information management unit 301, a selection unit 302, a request unit 303, and an exclusion unit 304. Each of these units of the server 30 according to the embodiment is implemented by the processor of the control device 31 shown in FIG. 2 and programs that are executed by the processor (e.g., programs stored in the storage device 32). However, the present disclosure is not limited to this, and each of these units may be implemented by dedicated hardware (electronic circuit).

The information management unit 301 is configured to manage information on each registered user (hereinafter also referred to as the "user information") and information on each registered vehicle 50 (hereinafter also referred to as the "vehicle information"). Identification information for identifying the user (hereinafter also referred to as the "user identification (ID)") is given to each user, and the information management unit 301 distinguishes and manages the user information of each user based on the user IDs. The user ID also serves as information for identifying the mobile terminal 80 carried by the user (terminal ID). The user information includes a communication address of the mobile terminal 80 carried by the user and a vehicle ID of the vehicle 50 that belongs to the user. The user information may include the amount of incentive received. The amount of incentive received is the total amount of incentives the user received for participating in demand response during a predetermined period. The vehicle ID is identification information for identifying the vehicle 50. The vehicle ID is given to each vehicle 50, and the information management unit 301 distinguishes and manages the vehicle information of each vehicle 50 based on the vehicle IDs. The vehicle information includes a communication address of the communication equipment 180 mounted on the vehicle 50 and the vehicle state received from the vehicle 50 (e.g., the state of the charger and discharger 120, the temperature and SOC of the battery 130, and the temperature adjustment status). The user information and the vehicle information are stored in the storage device 32.

The selection unit 302 is configured to select a predetermined desired number of vehicles 50 from a vehicle group. The vehicle group is stored in the storage device 32 and is updated as needed. The predetermined desired number of vehicles 50 is the number of vehicles 50 that can together provide a requested amount of demand response (i.e., amount of power adjustment). In the embodiment, the selection unit 302 selects the vehicles 50 that can participate in demand response (hereinafter also referred to as the "demand response vehicles"). The vehicle group is candidate demand response vehicles. All the vehicles 50 in the target area for demand response are initially set as the vehicle group. However, the vehicles 50 in the vehicle group may be excluded from the vehicle group by the exclusion unit 304. The exclusion unit 304 is configured to exclude any vehicle 50 that meets a predetermined exclusion requirement from the vehicle group. The vehicles 50 that are not suitable for the request (e.g., the vehicles 50 that rejected the request) can thus be excluded from the vehicle group by the exclusion unit 304.

The request unit 303 is configured to request each demand response vehicle selected by the selection unit 302 to perform external charging using the electric power of the power grid PG, perform external power feeding to the power grid PG, or follow a charging restriction during a demand response period. Examples of the charging restriction includes prohibition of charging and limitation on charging power (i.e., prohibition of charging with predetermined electric power or more). Hereinafter, the request to perform external charging from the request unit 303 will be simply referred to as the "charging request." The request to follow a charging restriction from the request unit 303 will be simply referred to as the "charging restriction request." The request to perform external power feeding from the request unit 303 will be simply referred to as the "power feeding request."

The request unit 303 is configured to balance supply and demand on the power grid PG by making a charging request, a charging restriction request, or a power feeding request. Hereinafter, the request to adjust power demand on the power grid PG (e.g., the charging request, the charging restriction request, and the power feeding request) will be referred to as the "PG adjustment request."

FIG. 5 is a flowchart of a process that is executed by the server 30 when the server 30 makes a PG adjustment request. The process shown in the flowchart is started when the aggregator is requested by the electric power company or the electricity market to balance supply and demand on the power grid PG. For example, the process of FIG. 5 is started when the server 30 receives the demand response execution instruction from the server 10. However, the present disclosure is not limited to this, and the process shown in FIG. 5 may be started when the aggregator instructs the server 30 via a predetermined input device (not shown) to perform processing for demand response (e.g., selection of the demand response vehicles and transmission of the setting signal).

Referring to FIG. 5 together with FIGS. 1 to 3, in step (hereinafter abbreviated as "S") 11, the selection unit 302 acquires the content of demand response (e.g., the content of the demand response execution instruction). The content of demand response includes the type of demand response (upward demand response or downward demand response), the amount of power adjustment, a target area for demand response, and a demand response period. Hereinafter, the demand response period for upward demand response will also be referred to as the "upward demand response period," and the demand response period for downward demand response will also be referred to as the "downward demand response period."

In S12, the selection unit 302 selects the demand response vehicles from the vehicle group (candidate demand response vehicles). The selection unit 302 selects the demand response vehicles based on, e.g., the state of each vehicle (e.g., the SOC of the battery 130) in the vehicle group, the next charging schedule, and the next power feeding schedule. In S13, the request unit 303 makes a PG adjustment request (e.g., a charging request, a charging restriction request, or a power feeding request) to the demand response vehicles selected in S12 by wireless communication. More specifically, the request unit 303 sends a signal indicating the content of the request (e.g., the type of request and a demand response schedule) to the user of each demand response vehicle and asks the user to respond (answer) whether he or she agrees to the request. This request from the request unit 303 to the user of each demand response vehicle may be sent to the communication equipment 180 mounted on the demand response vehicle or may be sent to the mobile terminal 80 carried by the user of the demand response vehicle.

In S14, the exclusion unit 304 determines whether all the users of the demand response vehicles have responded that they agree to the request. For example, the exclusion unit 304 performs this step when it receives the responses from all the users or when a predetermined time has elapsed since the request was made. In the embodiment, the users who have not responded for a predetermined time since the request was made are regarded as the users who responded that they do not agree to the request.

When NO in S14 (not all of the users agreed to the request), the exclusion unit 304 excludes the vehicles 50 belonging to the users who did not agree to the request from the vehicle group (candidate demand response vehicles) in S15. The routine then returns to S12. The vehicles 50 excluded in S15 will no longer be selected in S12.

When YES in S14 (all of the users agreed to the request), the request unit 303 saves the demand response vehicles and the demand response schedule for the agreed request in the storage device 32 and sends the setting signal to each demand response vehicle by wireless communication in S16. The setting signal includes a first setting signal for setting a charging schedule and a power feeding schedule and a second setting signal for setting the operation mode of the control unit 502.

FIG. 6 is a flowchart illustrating the details of S16 in FIG. 5. Referring to FIG. 6, in S21, the charging schedule and the power feeding schedule for each demand response vehicle are set by the first setting signal sent from the server 30 to each demand response vehicle. The first setting signal may overwrite the next charging schedule and next power feeding schedule registered in the demand response vehicle with schedules according to the agreed demand response schedule. For example, in the case where the demand response schedule requests external charging, the charging schedule is overwritten so as to increase the power demand on the power grid PG during the upward demand response period. In the case where the demand response schedule requests external power feeding, the power supply schedule is set so that external charging is performed on the power grid PG during the downward demand response period. At this time, the charging schedule may be overwritten so that the scheduled charging will be canceled. In the case where the demand response schedule requests a charging restriction, the charging schedule is overwritten so as to alleviate power shortage on the power grid PG during the downward demand response period. Each demand response vehicle thus performs the charge and discharge control of the battery 130 according to the request.

Figure 7:
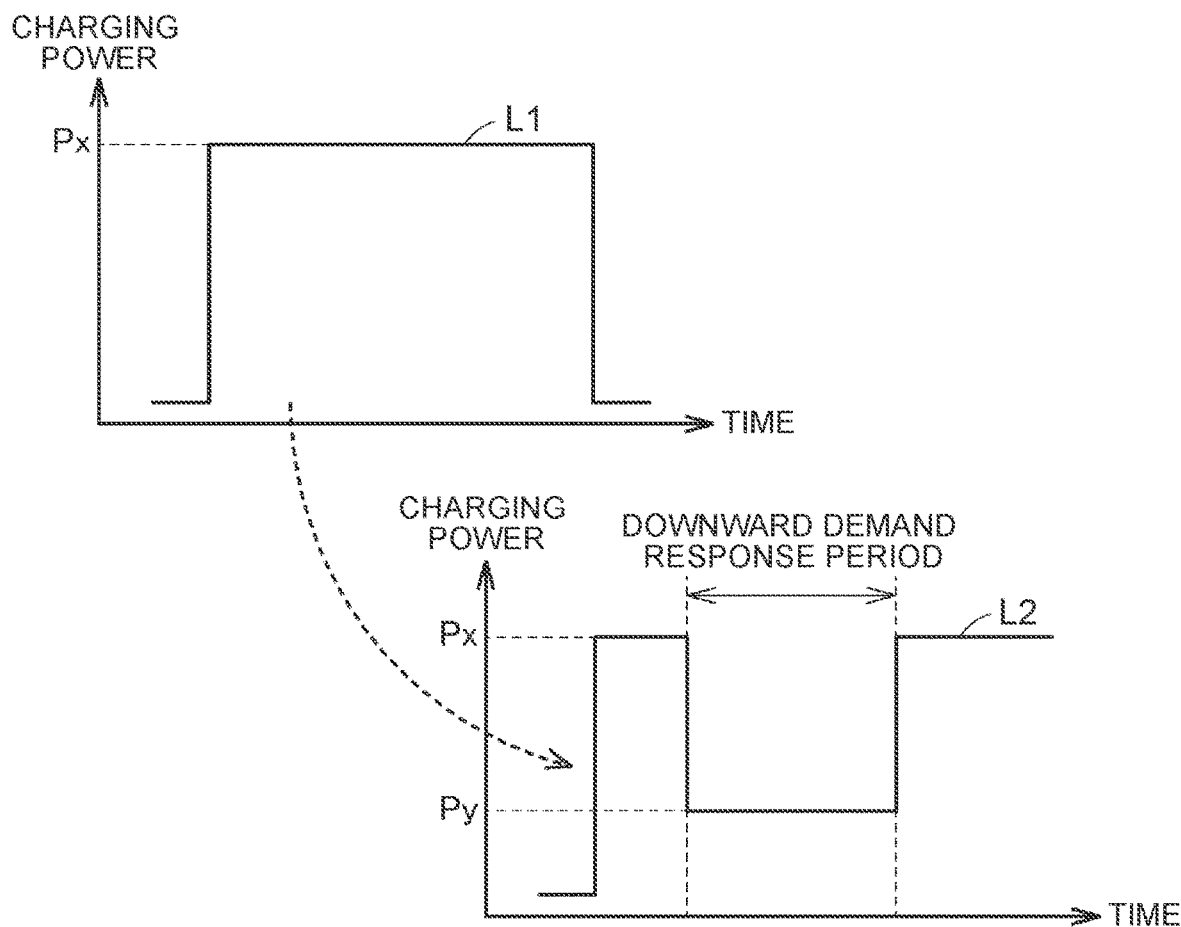
FIG. 7 illustrates an example of overwriting the next charging schedule when a demand response schedule requests a charging restriction in the electric energy storage system according to the embodiment of the present disclosure.

FIG. 7 illustrates an example of overwriting the next charging schedule when the demand response schedule requests a charging restriction. Referring to FIG. 7, the next charging schedule before overwriting is shown by line L1, and the next charging schedule after overwriting is shown by line L2. In the next charging schedule L1, the charging power is Px. In the next charging schedule L2, however, the charging power is limited to Py, which is smaller than Px, during the downward demand response period in response to the charging restriction request.

Referring back to FIG. 6, after S21, the request unit 303 determines in S22 whether the type of agreed demand response is downward demand response. When YES in S22 (the type of agreed demand response is downward demand response), the request unit 303 refers to the temperature adjustment status of each demand response vehicle and determines whether the operation mode of the control unit 502 is the OFF mode (FIG. 4) in S23. When the operation mode of the control unit 502 is not the OFF mode (NO in S23), the operation mode of the control unit 502 is set to the OFF mode by the second setting signal sent from the server 30 to the demand response vehicle in S24, and the process of FIG. 6 then ends. When the operation mode of the control unit 502 is the OFF mode (YES in S23), the process of FIG. 6 ends without performing S24.

When NO in S22 (the type of agreed demand response is upward demand response), the request unit 303 refers to the temperature adjustment status of each demand response vehicle and determines whether the operation mode of the control unit 502 is the ON mode (FIG. 4) in S25. When the operation mode of the control unit 502 is not the ON mode (NO in S25), the operation mode of the control unit 502 is set to the ON mode by the second setting signal sent from the server 30 to the demand response vehicle in S26, and the process of FIG. 6 then ends. When the operation mode of the control unit 502 is the ON mode (YES in S25), the process of FIG. 6 ends without performing S26.

S16 in FIG. 6 ends when the process of FIG. 6 ends as described above. Accordingly, the series of steps shown in FIG. 5 also ends. After S16 in FIG. 5, the user of each demand response vehicle may be prohibited from setting the charging schedule, the power feeding schedule, the battery temperature increase flag, and the battery temperature reduction flag until the end of the demand response period. After the agreed demand response period has elapsed, the demand response vehicles become non-demand response vehicles (i.e., the vehicles 50 that are not demand response vehicles). The server 30 (management computer for the power grid GP) according to the embodiment is provided outside the vehicles 50 and is configured to set the operation mode of the ECU 150 (particularly, the control unit 502) of each vehicle 50 by wireless communication with the vehicles 50. The server 30 is configured to request the users of the vehicles 50 to perform the charge and discharge control of the battery 130 so as to alleviate power shortage on the power grid PG (power network) (S13 in FIG. 5). The server 30 is configured to set the operation mode of the ECU 150 of each vehicle 50 to the OFF mode (S24 in FIG. 6) when the users of the vehicles 50 agree to the request (YES in both S14 in FIG. 5 and S22 in FIG. 6). The server 30 is configured to request the users of the vehicles 50 to perform the charge and discharge control of the battery 130 so as to increase the power demand on the power grid PG, and is configured to set the operation mode of the ECU 150 of each vehicle 50 to the ON mode (S26 in FIG. 6) when the users of the vehicles 50 agree to the request (YES in S14 in FIG. 5 and NO in S22 in FIG. 6).

The control unit 502 of each vehicle 50 performs the temperature adjustment control of the battery 130 according to the operation mode shown in FIG. 4. In the vehicle 50 that does not participate in demand response, the control unit 502 operates in the operation mode set by the user (either the ON mode or one of the first to third restriction modes). In the demand response vehicle, the control unit 502 operates in the operation mode set as described above (ON mode or OFF mode). The temperature adjustment control of the battery 130 that is performed in each vehicle 50 will be described with reference to FIGS. 8 and 9.

Figure 8:
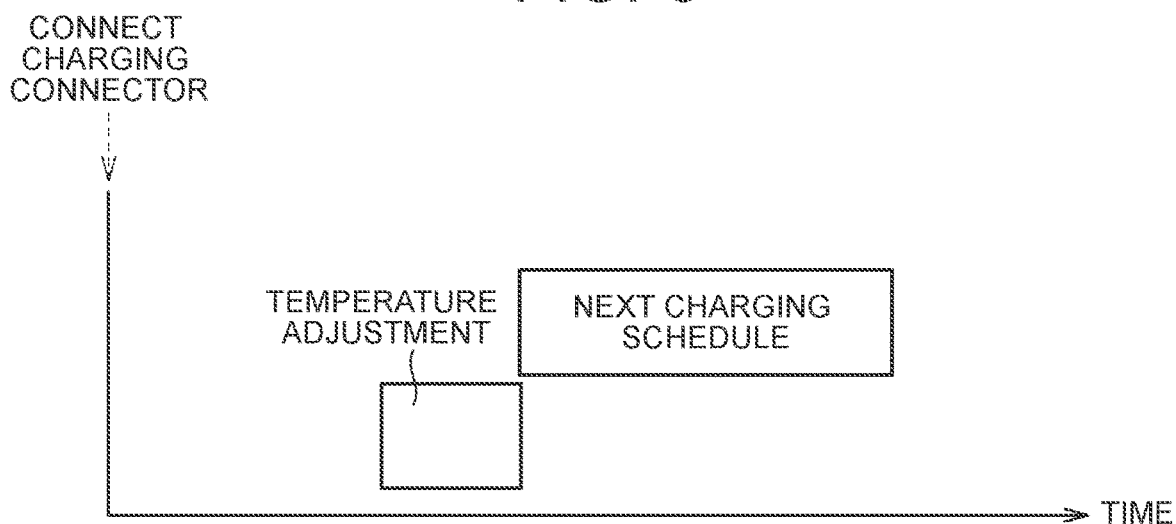
FIG. 8 illustrates the timing at which temperature adjustment control of an electric energy storage device according to the embodiment of the present disclosure is started.

FIG. 8 illustrates the start timing of the temperature adjustment control of the battery 130. Referring to FIG. 8 together with FIGS. 1 to 3, when the next charging schedule is registered in the vehicle 50, the start timing of the temperature adjustment control of the battery 130 (hereinafter also referred to as the "temperature adjustment timing") is set according to the registered next charging schedule. For example, by the time the next charging schedule is started, the temperature adjustment timing is set by the temperature adjustment control so that the temperature of the battery 130 is within a predetermined range (e.g., the range of T11 to T12). T11 and T12 can be set as desired as long as the condition that T12 is higher than T11 is satisfied. The information management unit 501 may determine the temperature adjustment timing based on the temperature of the battery 130 and the start timing of the next charging schedule.

The user connects the connector 43 of the charging cable 42 to the inlet 110 of the vehicle 50 to perform external charging according to the next charging schedule. The vehicle 50 is thus ready for external charging. The vehicle 50 is electrically connected to the power grid PG via the EVSE 40. When the vehicle 50 is electrically connected to the power grid PG and the temperature adjustment control is allowed (that is, when the operation mode of the control unit 502 is not the OFF mode), the control unit 502 performs the temperature adjustment control of the battery 130 at the temperature adjustment timing determined as described above.

Figure 9:
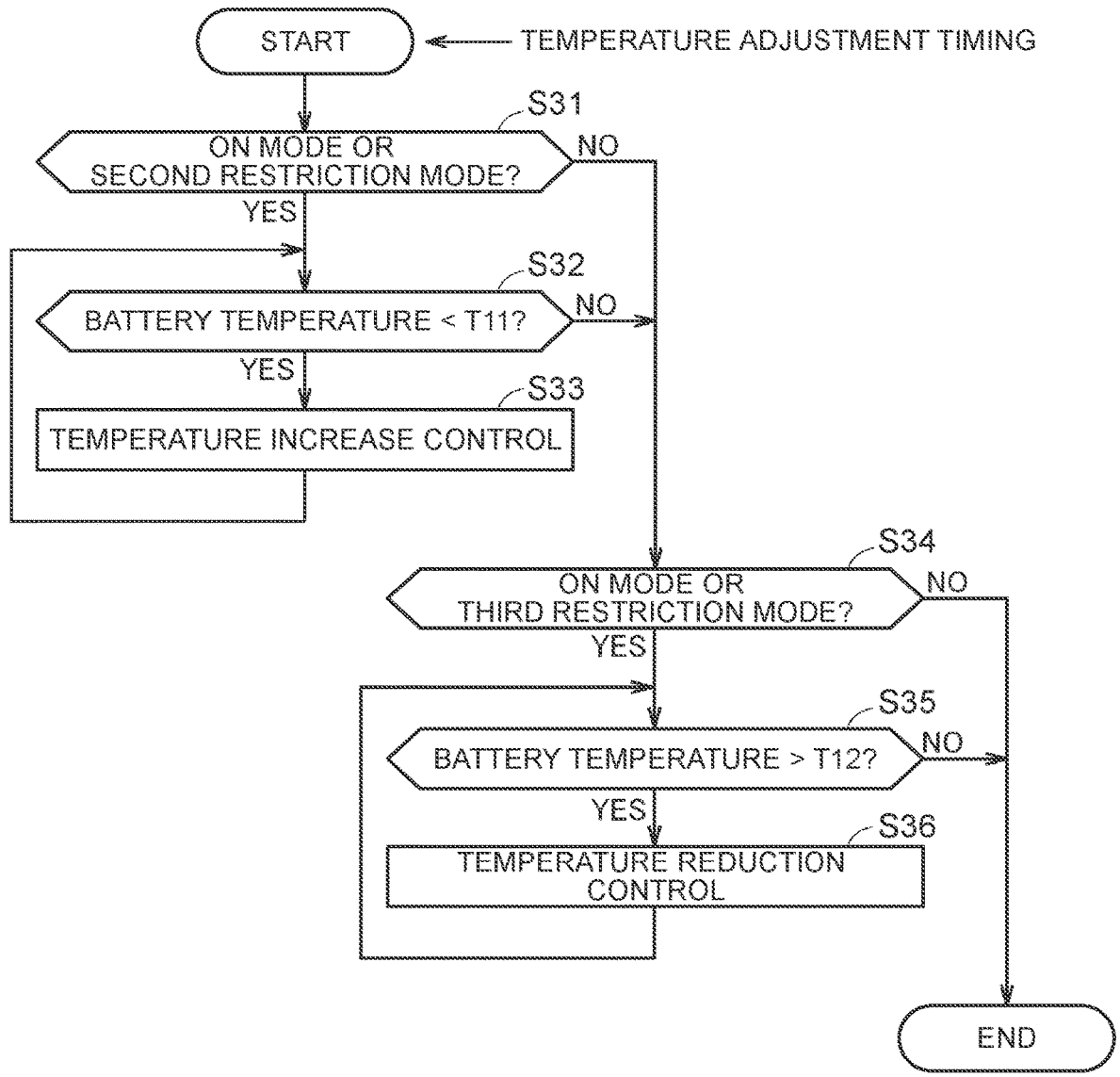
FIG. 9 is a flowchart of a process for the temperature adjustment control of the electric energy storage device according to the embodiment of the present disclosure.

FIG. 9 is a flowchart of a process for the temperature adjustment control of the battery 130. The process shown in this flowchart is started at the temperature adjustment timing.

In S31, the control unit 502 determines whether the operation mode of the control unit 502 is either the ON mode or the second restriction mode. When the operation mode of the control unit 502 is the ON mode or the second restriction mode (YES in S31), execution of the temperature increase control is allowed. Accordingly, when it is determined in S32 that the temperature of the battery 130 is lower than T11 (YES in S32), the temperature increase control is performed in S33. The control unit 502 increases the temperature of the battery 130 by driving the heating device 133 using the electric power supplied from the power grid PG. Until the temperature of the battery 130 becomes T11 or higher, the determination result in S32 is YES and S32 and S33 are repeated. When the temperature of the battery 130 becomes T11 or higher (NO in S32), the routine proceeds to S34. The routine also proceeds to S34 when the operation mode of the control unit 502 is neither the ON mode nor the second restriction mode (NO in S31).

In S34, the control unit 502 determines whether the operation mode of the control unit 502 is either the ON mode or the third restriction mode. When the operation mode of the control unit 502 is the ON mode or the third restriction mode (YES in S34), execution of the temperature reduction control is allowed. Accordingly, when it is determined in S35 that the temperature of the battery 130 is higher than that of T12 (YES in S35), the temperature reduction control is performed in S36. The control unit 502 reduces the temperature of the battery 130 by driving the cooling device 132 using the electric power supplied from the power grid PG. Until the temperature of the battery 130 becomes T12 or less, the determination result in S35 is YES and S35 and S36 are repeated. When the temperature of the battery 130 becomes T12 or less (NO in S35), the series of steps shown in FIG. 9 ends. The series of steps shown in FIG. 9 also ends when the operation mode of the control unit 502 is neither the ON mode nor the third restriction mode (NO in S34).

In the embodiment, the temperature adjustment control of the battery 130 is performed immediately before the start of the charging schedule (see FIG. 8). However, the temperature adjustment timing is not limited to this timing and can be set as desired. For example, the temperature adjustment timing may be the same as the start time of the charging schedule so that the temperature adjustment control of the battery 130 is performed during charging of the battery 130. The temperature adjustment timing may come at predetermined time intervals (e.g., about every 30 minutes) in a period during which the vehicle 50 is electrically connected to the power grid PG and the temperature adjustment control is allowed. The temperature adjustment control of the battery 130 may be performed only before charging, may be performed only during charging, or may be performed both before and during charging.

The control unit 502 of each vehicle 50 performs the charge and discharge control of the battery 130 according to the charging schedule and power feeding schedule in the storage device 153. In the vehicles 50 that do not participate in demand response, the user sets the timer charging schedule as the charging schedule. In the demand response vehicles, the charging schedule or the power feeding schedule is set in S21 of FIG. 6 described above.

Figure 10:
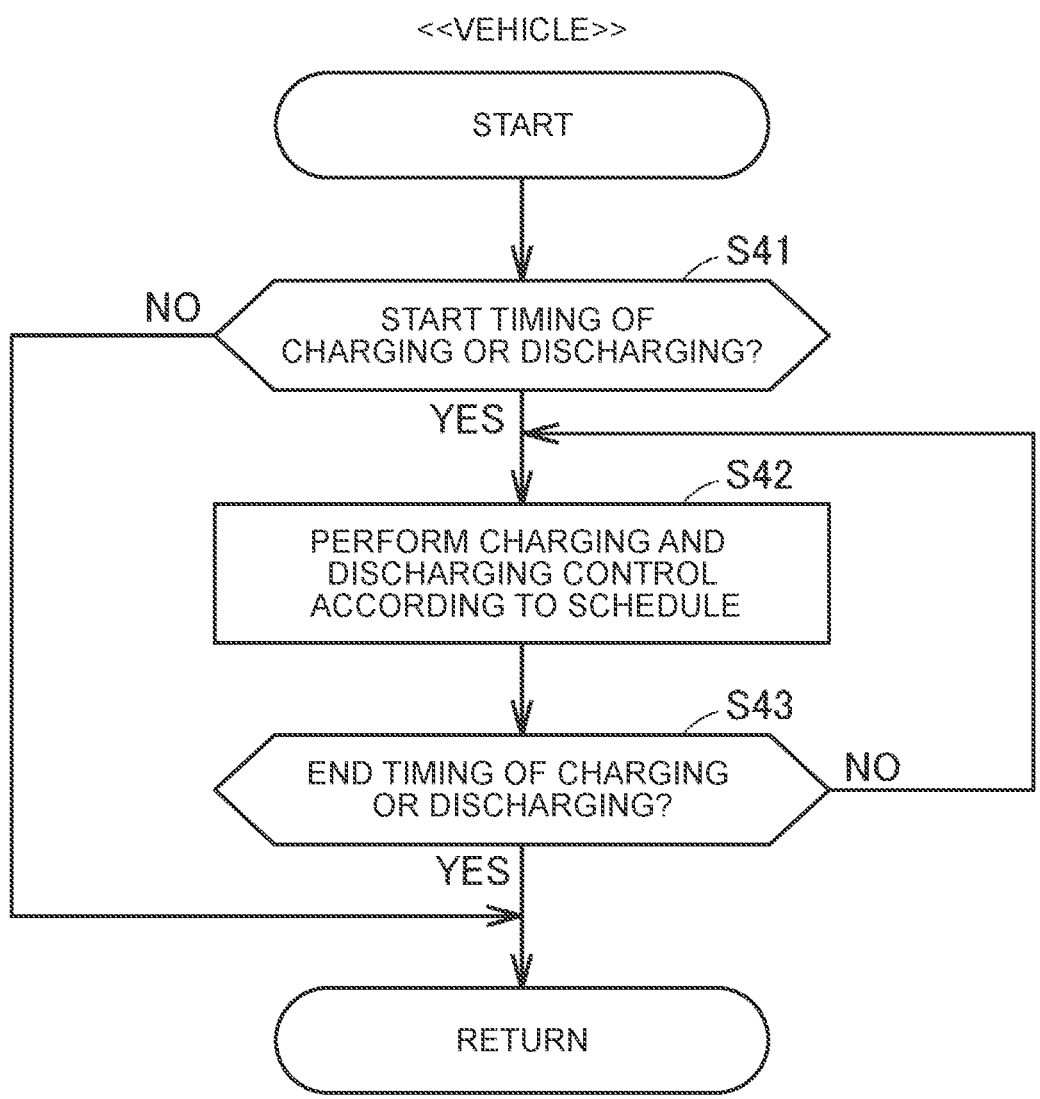
FIG. 10 is a flowchart of a process that is executed by the vehicle for which a charging schedule or a power feeding schedule have been set in the electric energy storage system according to the embodiment of the present disclosure.

FIG. 10 is a flowchart of a process that is executed by the vehicle 50 for which the charging schedule or the power feeding schedule has been set. The process shown in this flowchart is repeatedly executed when the vehicle 50 is electrically connected to the power grid PG and there is an unexecuted schedule (charging schedule or power feeding schedule) in the storage device 153. Each of the registered charging and power feeding schedules is deleted after it is executed. The process of FIG. 10 ends when there is no more unexecuted schedule in the storage device 153.

Referring to FIG. 10 together with FIGS. 1 to 3, the control unit 502 waits for the start timing of the registered next charging or discharging schedule (next charging schedule or next power feeding schedule) to come in S41. When the start timing of the next charging or discharging schedule comes (YES in S41), the control unit 502 performs the charging and discharging control of the battery 130 according to the started schedule in S42. When the started schedule is the charging schedule (see, e.g., FIG. 7), the control unit 502 performs external charging. When the started schedule is the power feeding schedule, the control unit 502 performs external power feeding.

In S43, the control unit 502 determines whether the end timing of the started schedule has come. Until the end timing comes, the determination result in S43 is NO and S42 and S43 are repeated. When the end timing comes (YES in S43), the routine returns to the first step (S41), and in S41, the control unit 502 waits for the start timing of the next schedule to come.

As described above, the VGI system 1 (electric energy storage system) according to the embodiment includes the battery 130 and the ECU 150 that performs the charge and discharge control and temperature adjustment control of the battery 130. The battery 130 is configured to be electrically connected to the power grid PG (power network). When the ECU 150 performs the charge and discharge control according to the PG adjustment request from the server 30 (i.e., the management computer for the power grid PG) so as to alleviate power shortage on the power grid PG (YES in S22 of FIG. 6), the operation mode of the control unit 502 is set to the OFF mode. Execution of the temperature adjustment control of the battery 130 by the ECU 150 is thus restricted (see FIG. 4). This reduces power consumption for adjusting the temperature of the battery 130. As described above, in the VGI system 1, electric power is restrained from being consumed contrary to the request during the period in which alleviation of power shortage on the power grid PG is requested.

In the above embodiment, the server 30 sets the battery temperature increase flag and the battery temperature reduction flag according to the type of demand response (upward demand response or downward demand response) (S24, S26 in FIG. 6). However, the present disclosure is not limited to this, and the battery temperature increase flag and the battery temperature reduction flag may be set by the vehicle.

Figure 11:
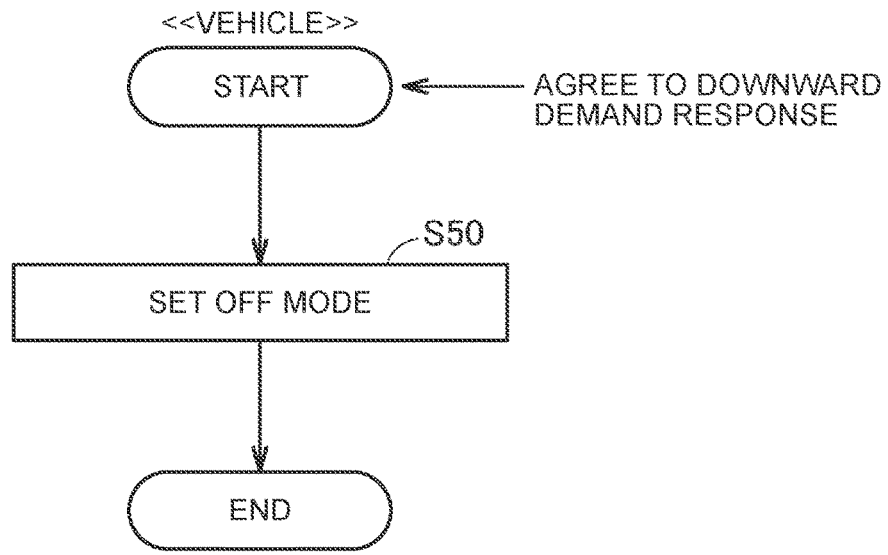
FIG. 11 is a flowchart of a first modification in which a battery temperature increase flag and a battery temperature reduction flag are set by the vehicle.

FIG. 11 is a flowchart of a first modification in which the battery temperature increase flag and the battery temperature reduction flag are set by the vehicle. In this modification, the server 30 only sets the schedule (S21 in FIG. 6) in S16 of FIG. 5. The battery temperature increase flag and the battery temperature reduction flag are set by each demand response vehicle.

Referring to FIG. 11 together with FIGS. 1 to 3, the process shown in this flowchart is started when the user agrees to downward demand response. Specifically, in S13 of FIG. 5 described above, the request unit 303 sends a signal indicating the content of the PG adjustment request (e.g., the type of request and the demand response schedule) to the user of each demand response vehicle. The user of each demand response vehicle can respond (answer) to the PG adjustment request by operating the input device 160 or the mobile terminal 80. When the user responds, the signal indicating the content of the request (e.g., the type of request and the demand response schedule) and a signal corresponding to the user's operation (i.e., a signal indicating whether the user agreed to the request) are input to the ECU 150 via the communication equipment 180. When the user agreed to downward demand response (e.g., a charging restriction request or a power feeding request), the ECU 150 performs S50 shown in FIG. 11. In S50, the ECU 150 sets the battery temperature increase flag and the battery temperature reduction flag in the storage device 153 to off. The operation mode of the control unit 502 is thus set to the OFF mode.

In the modification, the ECU 150 (see FIGS. 1 to 3) of the vehicle 50 is configured to execute the process shown in FIG. 11. In the process shown in FIG. 11, the operation mode of the control unit 502 is set to the OFF mode when the user agrees to downward demand response. Electric power is thus restrained from being consumed contrary to the request during the period in which alleviation of power shortage on the power grid PG is requested.

Figure 12:
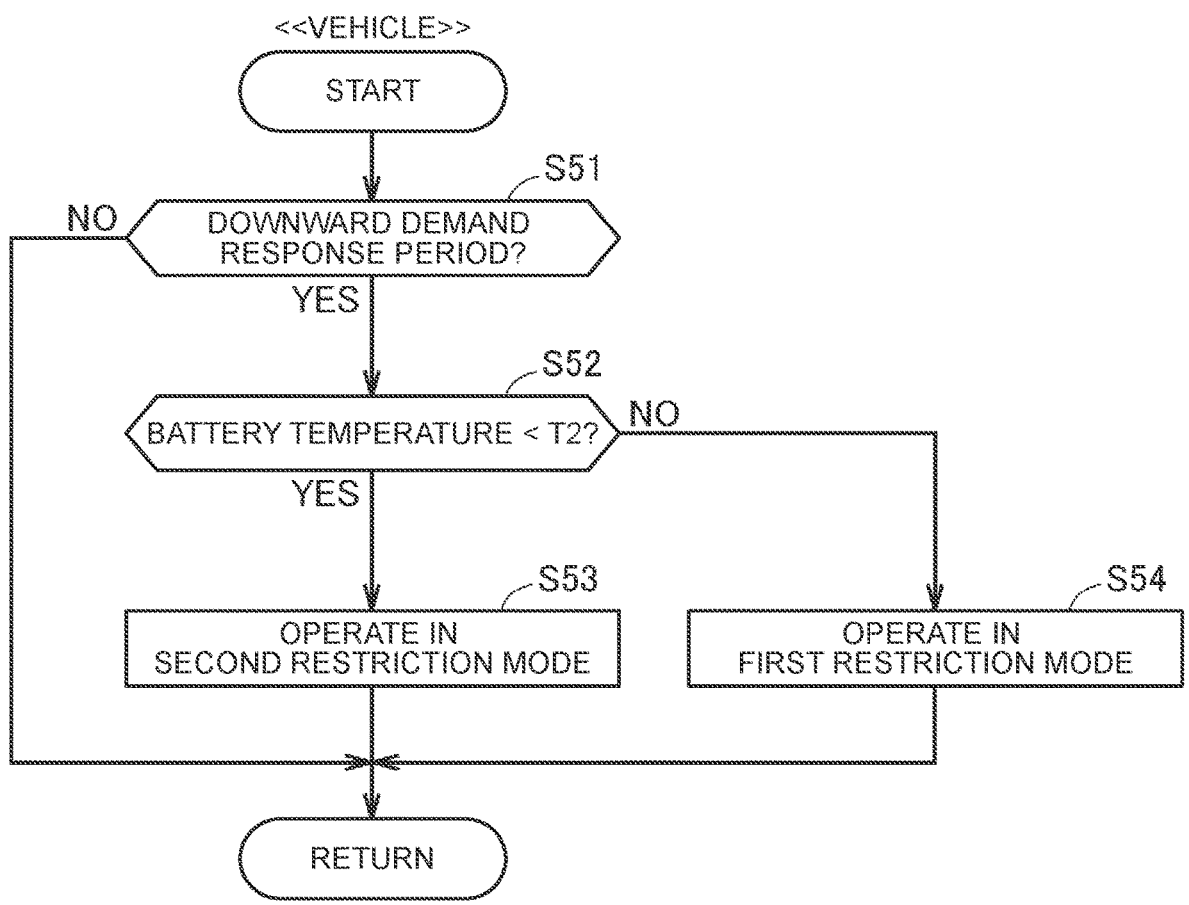
FIG. 12 is a flowchart of a second modification in which a battery temperature increase flag and a battery temperature reduction flag are set by the vehicle.

FIG. 12 is a flowchart of a second modification in which the battery temperature increase flag and the battery temperature reduction flag are set by the vehicle. In this modification, the server 30 only sets the schedule (S21 in FIG. 6) in S16 of FIG. 5. The battery temperature increase flag and the battery temperature reduction flag are set by each demand response vehicle.

Referring to FIG. 12 together with FIGS. 1 to 3, the process shown in this flowchart is repeatedly executed in a predetermined cycle. In S51, the ECU 150 determines whether the current time is during a downward demand response period. For example, the ECU 150 refers to the information in the storage device 153, and when a charging schedule or a power feeding schedule for downward demand response (charging restriction request or power feeding request), the ECU 150 determines in S51 that the current time is during a downward demand response period (YES in S51). When YES in S51, the routine proceeds to S52. When the current time is not during a downward demand response period (NO in S51), S52 and the subsequent steps will not be performed.

In S52, the ECU 150 determines whether the temperature of the battery 130 is lower than a predetermined temperature (hereinafter referred to as "T2") based on the output of the monitoring module 131 (FIG. 1). In this modification, T2 represents the threshold value between the temperature range in which the battery 130 does not freeze and the temperature range in which the battery 130 can freeze. T2 is a temperature lower than T11 used in S32 of FIG. 9.

When the temperature of the battery 130 is lower than T2 (YES in S52), the ECU 150 sets the battery temperature increase flag to on and the battery temperature reduction flag to off in S53. The operation mode of the control unit 502 is thus set to the second restriction mode. When the temperature of the battery 130 is lower than T2, it means that the battery 130 can freeze. In the second restriction mode, execution of the temperature reduction control is prohibited, but execution of the temperature increase control is allowed. Since the temperature increase control of the battery 130 (e.g., S32 and S33 in FIG. 9) is performed, the temperature of the battery 130 increases to the temperature range in which the battery 130 does not freeze (e.g., T11). The battery 130 is therefore less likely to freeze in, e.g., cold areas.

When the temperature of the battery 130 is T2 or higher (NO in S52), the ECU 150 sets the battery temperature increase flag to off and the battery temperature reduction flag to off in S54. The operation mode of the control unit 502 is thus set to the first restriction mode (OFF mode).

In the modification, the ECU 150 (see FIGS. 1 to 3) of the vehicle 50 is configured to execute the process shown in FIG. 12. In the process shown in FIG. 12, execution of the temperature adjustment control of the battery 130 is restricted by the first restriction mode or the second restriction mode during the period in which alleviation of power shortage on the power grid PG (power network) is requested (YES in S51). According to the above configuration, electric power is restrained from being consumed contrary to the request during the period in which alleviation of power shortage on the power grid PG is requested. Execution of the temperature increase control is allowed when the temperature of the battery 130 is lower than T2 (YES in S52) during the period in which alleviation of power shortage on the power grid PG is requested. The temperature of the battery 130 is therefore less likely to be excessively reduced.

In the above embodiment and modifications, the ECU 150 is configured to execute the process shown in FIG. 10. Specifically, when the vehicle 50 is electrically connected to the power grid PG (power network), the ECU 150 performs the charge and discharge control of the battery 130 according to the next charging schedule and next power feeding schedule in the storage device 153. However, the present disclosure is not limited to this, and the charge and discharge control of the battery 130 during the demand response period may be performed by the server 30. The server 30 may be configured to remotely control the ECU 150 to perform the charge and discharge control of the battery 130 during the agreed demand response period (i.e., the period of the request) when the server 30 requests the users of the demand response vehicles to help adjust the power demand on the power grid PG and the users of the demand response vehicles agree to the request (PG adjustment request). The ECU 150 may be configured to execute a process shown in FIG. 13 that will be described below instead of the process shown in FIG. 10 during the demand response period.

Figure 13:
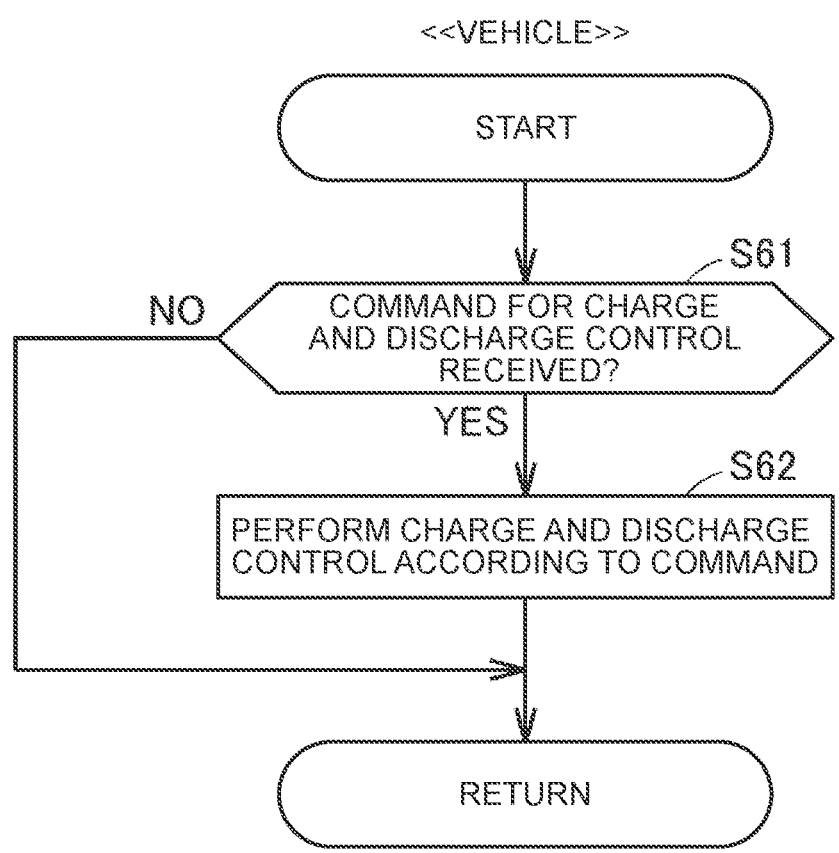
FIG. 13 is a flowchart of a modification of charge and discharge control of an electric energy storage device during a demand response period.

FIG. 13 is a flowchart of a modification of the charge and discharge control of the battery 130 during the demand response period. The ECU 150 executes the process shown in FIG. 10 when it is not during the demand response period, and executes the process shown in FIG. 13 instead of the process shown in FIG. 10 during the demand response period. In the modification, the control unit 502 (FIG. 3) of the ECU 150 is remotely controlled by the server 30 during the demand response period. The remote control of the control unit 502 is basically prohibited. However, the remote control of the control unit 502 is allowed when the user of the vehicle 50 agrees to the PG adjustment request from the server 30. During the demand response period, the server 30 sends a charge command or a power feed command to the communication equipment 180 of the demand response vehicles (more specifically, the vehicles 50 belonging to the users who agreed to the PG adjustment request).

Referring to FIG. 13 together with FIGS. 1 to 3, in S61, the control unit 502 of the ECU 150 waits for a command for the charge and discharge control (a charge command or a power feed command) from the server 30. When the control unit 502 receives the command from the server 30 (YES in S61), the control unit 502 performs the charge and discharge control of the battery 130 according to the command in S62.

S61 and S62 are repeated while the ECU 150 continuously receives the command from the server 30. The series of steps shown in FIG. 13 ends when the demand response period ends.

The server 30 according to the modification executes the process shown in FIG. 13 during the demand response period (the period of the request). The server 30 remotely controls the ECU 150 during the demand response period. The server 30 can perform the charge and discharge control of the battery 130 by such remote control. The server 30 may perform the temperature adjustment control of the battery 130 instead of or in addition to the charge and discharge control of the battery 130 by remotely controlling the ECU 150.

In the above embodiment and modifications, each vehicle 50 has the configuration shown in FIG. 1. Such a vehicle 50 includes the electric heating device 133 configured to heat the battery 130 and the electric cooling device 132 configured to cool the battery 130. The ECU 150 mounted on the vehicle 50 is configured to heat the battery 130 by the heating device 133 in the temperature increase control. The ECU 150 is also configured to cool the battery 130 by the cooling device 132 in the temperature reduction control. In such a vehicle 50, heating of the battery 130 and cooling of the battery 130 can be separately performed by the heating device 133 and the cooling device 132. With this configuration, the temperature increase control and the temperature reduction control can be easily independently restricted.

The method for reducing the temperature of the battery 130 is not limited to the air moving device. For example, the battery 130 may be cooled by circulating a cooling medium around the battery 130. The cooling method may be water cooling or air cooling.

The method for increasing the temperature of the battery 130 is not limited to the electric heater. For example, the temperature of the battery 130 may be increased by applying a current to the battery 130 (e.g., repeating charging and discharging).

The configuration of the vehicle is not limited to that shown in FIG. 1. For example, in the configuration shown in FIG. 1, a charging device capable of performing only external charging or a power feeding device capable of performing only external power feeding may be used instead of the charger and discharger 120. The vehicle may be configured to be charged in a non-contact manner. The vehicle is not limited to a passenger car, and may be a bus or a truck.

The electric energy storage system may be an electric energy storage system mounted on transport (ship, airplane, etc.) other than a vehicle, may be an electric energy storage system mounted on an unmanned moving object (automated guided vehicle (AGV), agricultural equipment, mobile robot, drone, etc.), or may be an electric energy storage system installed in a building (house, factory, etc.).

The embodiment disclosed herein should be considered illustrative in all respects, and not restrictive. The scope of the disclosure is defined by the claims rather than by the above description of the embodiment, and is intended to include all modifications that fall within the scope of the claims or the equivalents thereof.

What is claimed is:

1. An electric energy storage system, comprising:
   an electric energy storage device configured to be electrically connected to a power network;
   a management computer for the power network;
   a control device configured to perform charge and discharge control and temperature adjustment control of the electric energy storage device, wherein the control device is configured such that execution of the temperature adjustment control is restricted when the control device performs the charge and discharge control so as to alleviate power shortage on the power network according to a request from the management computer; and a vehicle including the electric energy storage device and the control device, wherein:

the control device is configured to operate in an operation mode selected from modes including an ON mode and an OFF mode;

the ON mode is an operation mode in which execution of the temperature adjustment control is allowed;

the OFF mode is an operation mode in which execution of the temperature adjustment control is prohibited;

the control device is configured such that execution of the temperature adjustment control is restricted by the OFF mode;

the management computer is provided outside the vehicle and is configured to set the operation mode of the control device by wireless communication with the vehicle;

the management computer is configured to set the operation mode of the control device to the OFF mode when the management computer requests a user of the vehicle to perform the charge and discharge control of the electric energy storage device so as to alleviate the power shortage on the power network and the user of the vehicle agrees to the request; and the management computer is configured to set the operation mode of the control device to the ON mode when the management computer requests the user of the vehicle to perform the charge and discharge control of the electric energy storage device so as to increase power demand on the power network and the user of the vehicle agrees to the request.

2. The electric energy storage system according to claim 1, wherein the control device is configured to perform the charge and discharge control of the electric energy storage device according to a predetermined next charging schedule, and is configured to perform the temperature adjustment control of the electric energy storage device using electric power supplied from the power network at a timing determined based on the predetermined next charging schedule when the vehicle is electrically connected to the power network and the temperature adjustment control is allowed.

3. A vehicle, comprising:

an electric energy storage device configured to be electrically connected to a power network; and a control device configured to perform charge and discharge control and temperature adjustment control of the electric energy storage device, wherein:

the temperature adjustment control includes temperature increase control in which a temperature of the electric energy storage device is increased and temperature reduction control in which the temperature of the electric energy storage device is reduced;

the control device is configured to operate in an operation mode selected from modes including an ON mode, a first restriction mode and a second restriction mode during a period in which a management computer for the power network requests alleviation of power shortage on the power network;

the first restriction mode is an operation mode in which execution of both the temperature increase control and the temperature reduction control is prohibited;

the second restriction mode is an operation mode in which execution of the temperature increase control is allowed and execution of the temperature reduction control is prohibited;

the ON mode is an operation mode in which execution of the temperature adjustment control is allowed;

the management computer is provided outside the vehicle and is configured to set the operation mode of the control device by wireless communication with the vehicle;

the management computer is configured to set the operation mode of the control device to the first restriction mode when the management computer requests a user of the vehicle to perform the charge and discharge control of the electric energy storage device so as to alleviate the power shortage on the power network and the user of the vehicle agrees to the request; and the management computer is configured to set the operation mode of the control device to the ON mode when the management computer requests the user of the vehicle to perform the charge and discharge control of the electric energy storage device so as to increase power demand on the power network and the user of the vehicle agrees to the request.

4. The vehicle according to claim 3, wherein the control device is configured to operate in the first restriction mode when the temperature of the electric energy storage device is higher than a predetermined temperature during the period in which the management computer for the power network requests the alleviation of the power shortage on the power network, and is configured to operate in the second restriction mode when the temperature of the electric energy storage device is lower than the predetermined temperature during the period in which the management computer for the power network requests the alleviation of the power shortage on the power network.

5. The vehicle according to claim 3, further comprising:

an electric heating device configured to heat the electric energy storage device; and an electric cooling device configured to cool the electric energy storage device, wherein the control device is configured to heat the electric energy storage device by the electric heating device in the temperature increase control, and is configured to cool the electric energy storage device by the electric cooling device in the temperature reduction control.

* * * * *